United States Patent
De Vido

(10) Patent No.: US 11,022,772 B2
(45) Date of Patent: Jun. 1, 2021

(54) LASER-CHAIN ALIGNMENT

(71) Applicant: United Kingdom Research and Innovation, Swindon (GB)

(72) Inventor: Mariastefania De Vido, Didcot (GB)

(73) Assignee: United Kingdom Research and Innovation, Swindon (GB)

( * ) Notice: Subject to any disclaimer, the term of this patent is extended or adjusted under 35 U.S.C. 154(b) by 0 days.

(21) Appl. No.: 16/086,218

(22) PCT Filed: Mar. 7, 2017

(86) PCT No.: PCT/GB2017/050603
§ 371 (c)(1),
(2) Date: Sep. 18, 2018

(87) PCT Pub. No.: WO2017/163009
PCT Pub. Date: Sep. 28, 2017

(65) Prior Publication Data
US 2020/0018917 A1    Jan. 16, 2020

(30) Foreign Application Priority Data

Mar. 23, 2016 (GB) .................... 1604940

(51) Int. Cl.
*G02B 7/00* (2021.01)
*G02B 5/18* (2006.01)
*G02B 27/62* (2006.01)

(52) U.S. Cl.
CPC ........... *G02B 7/003* (2013.01); *G02B 5/1828* (2013.01); *G02B 27/62* (2013.01)

(58) Field of Classification Search
CPC ...... G02B 7/003; G02B 5/1828; G02B 27/62; G02B 7/00; G01B 11/27

(Continued)

(56) References Cited

U.S. PATENT DOCUMENTS

| 4,668,089 A | 5/1987 | Oshida et al. |
| 4,862,008 A | 8/1989 | Oshida et al. |
| 5,191,465 A | 3/1993 | Yamashita et al. |

FOREIGN PATENT DOCUMENTS

| GB | 1500428 A | 2/1978 |
| JP | 59-202411 A | 11/1984 |

(Continued)

OTHER PUBLICATIONS

Brunson Instrument Co., "Optical alignment equipment," Cubic Precision, K+E Electro Optical Products, 44 pp. (2011).

(Continued)

*Primary Examiner* — Tuyen Tra
(74) *Attorney, Agent, or Firm* — Leydig, Voit & Mayer, Ltd.

(57) ABSTRACT

A method of aligning an optical component in a laser system using diffraction patterns of alignment references includes: placing a first alignment reference in the path of a laser beam upstream of an optical component, the first alignment reference having first reference features forming a first diffraction pattern when illuminated by the laser beam; placing a second alignment reference in the path of the laser beam downstream of the first alignment reference and the optical component, the second alignment reference having second reference features forming a second diffraction pattern when illuminated by the laser beam; illuminating the alignment references and optical component with the laser beam; monitoring the combined diffraction pattern of the reference features of the alignment references downstream of the second alignment reference; and adjusting the relative position and/or orientation of the optical component towards the combined diffraction pattern indicating alignment of the optical component to the laser beam. There is also disclosed (Continued)

a system of diffraction-based alignment references for aligning an optical component in a laser system.

34 Claims, 18 Drawing Sheets

(58) Field of Classification Search
USPC .......................................... 359/642, 811, 813
See application file for complete search history.

(56) References Cited

FOREIGN PATENT DOCUMENTS

| JP | 9-43862 A | 2/1997 |
|---|---|---|
| KR | 10-2007-0052789 A | 5/2007 |
| WO | WO 2006/033544 A1 | 3/2006 |

OTHER PUBLICATIONS

Herrmannsfeldt et al., "Precision Alignment Using a System of Large Rectangular Fresnel Lenses," Applied Optics, Washington, DC; 7(6), pp. 995-1005 (Jun. 1968).
Lawrence Livermore Laboratory, "Alignment of the Twenty-Beam Shiva Laser," Energy and Technology Review, Defense Programs, pp. 1-12 (Dec. 1978).
Wu et al., "Micromachined free-space integrated micro-optics", *Sensors and Actuators A: Physical*, 50(1-2), pp. 127-134 (1995).
United Kingdom Intellectual Property Office, Search Report in United Kingdom Patent Application No. GB1604940.5, 5 pp. (dated Oct. 14, 2016).
European Patent Office, International Search Report in International Patent Application No. PCT/GB2017/050603, 5 pp. (dated May 16, 2017).
European Patent Office, Written Opinion in International Patent Application No. PCT/GB2017/050603, 12 pp. (dated May 16, 2017).
Korean Patent Office, Notification of Preliminary Refusal in Korean Patent Application No. 10-2018-7029654, 18pp. (dated Oct. 30, 2020).

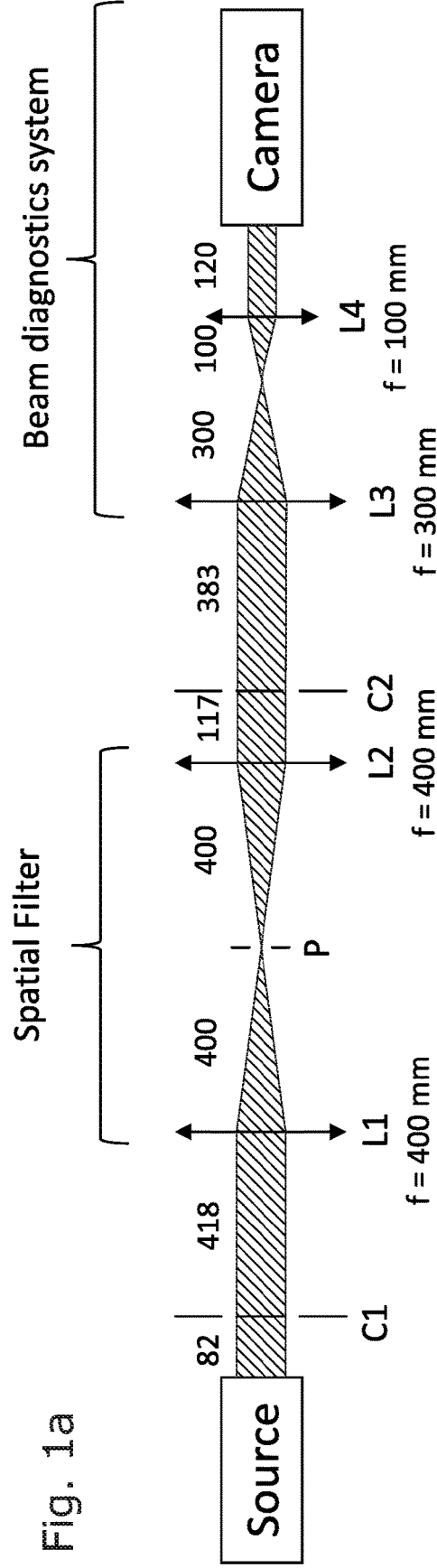
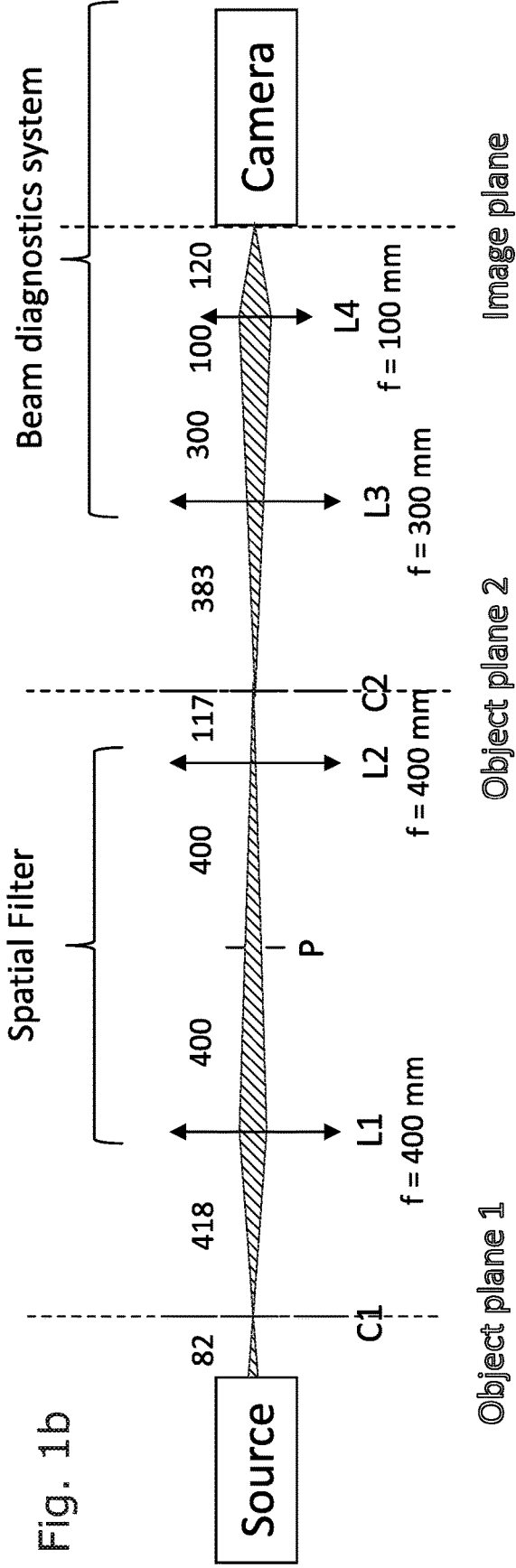
Fig. 1a
Fig. 1b

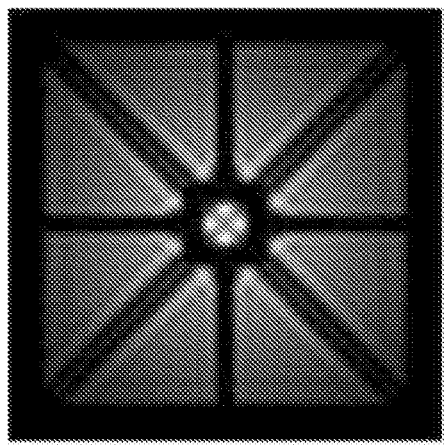
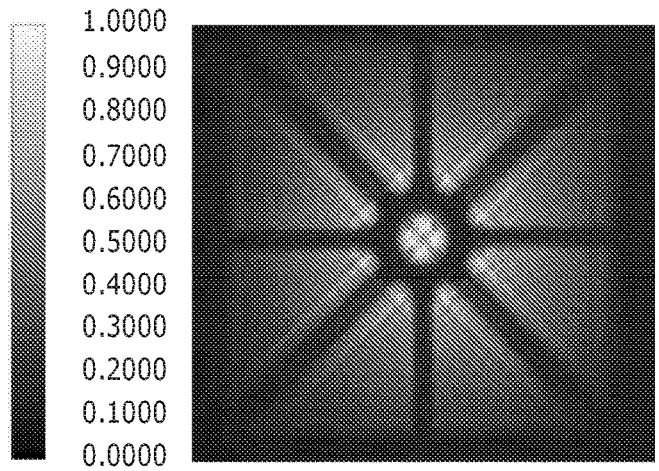
Fig. 8(a)  Fig. 8(b)
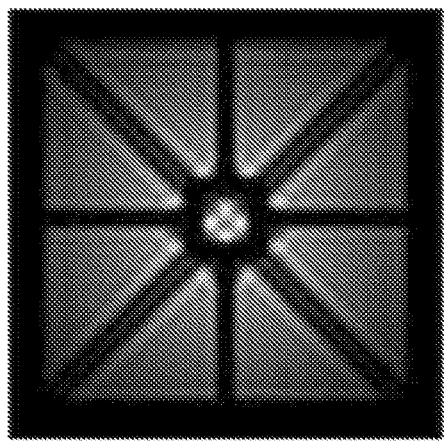
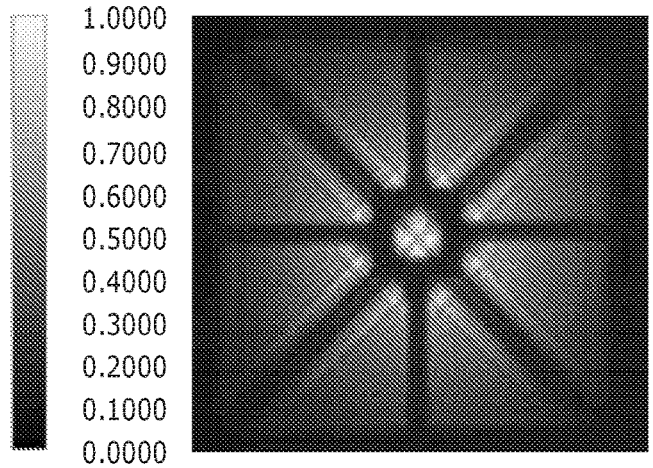
Fig. 9(a)  Fig. 9(b)

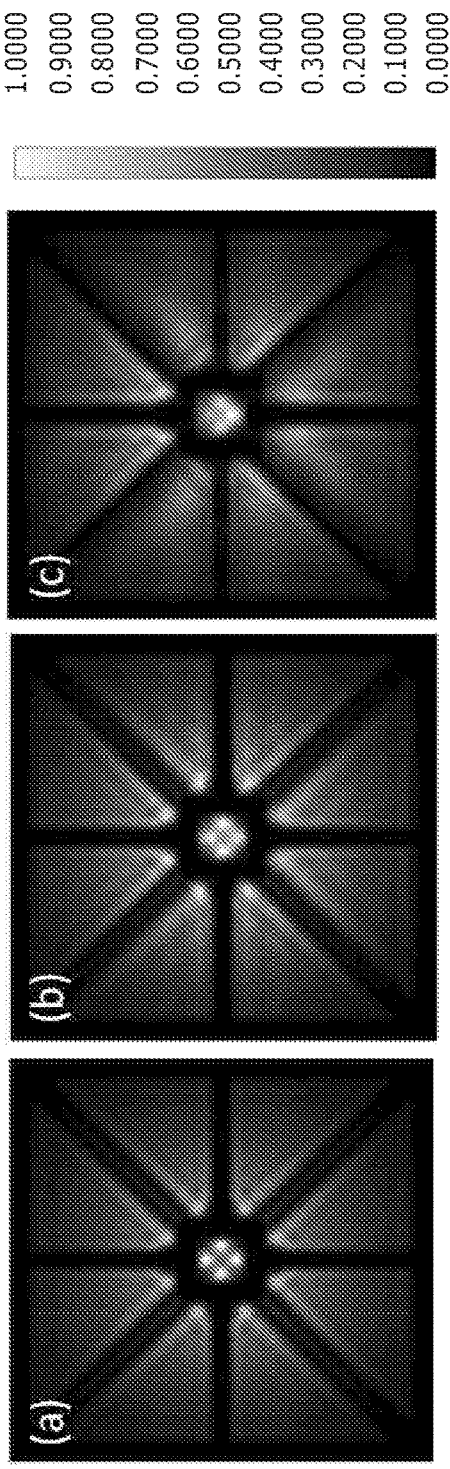
Fig. 17
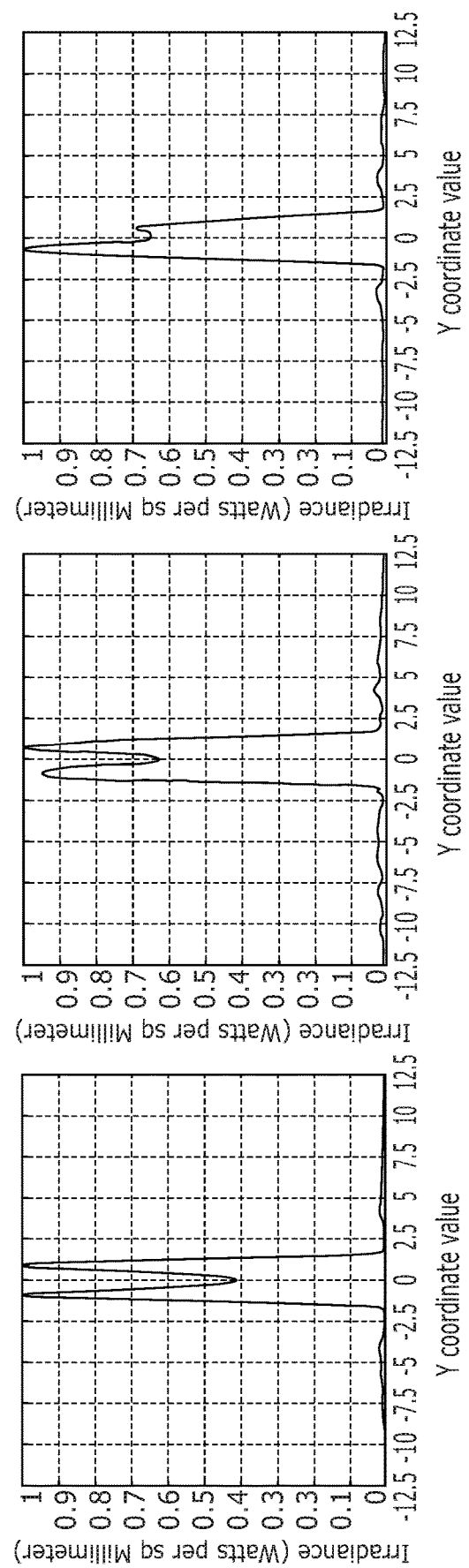
Fig. 18(a)
Fig. 18(b)
Fig. 18(c)

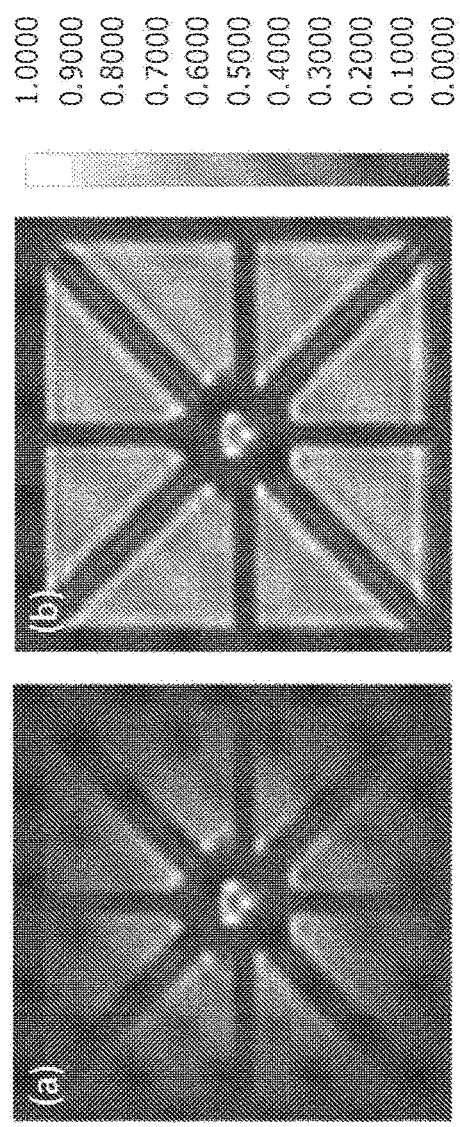
Fig. 21
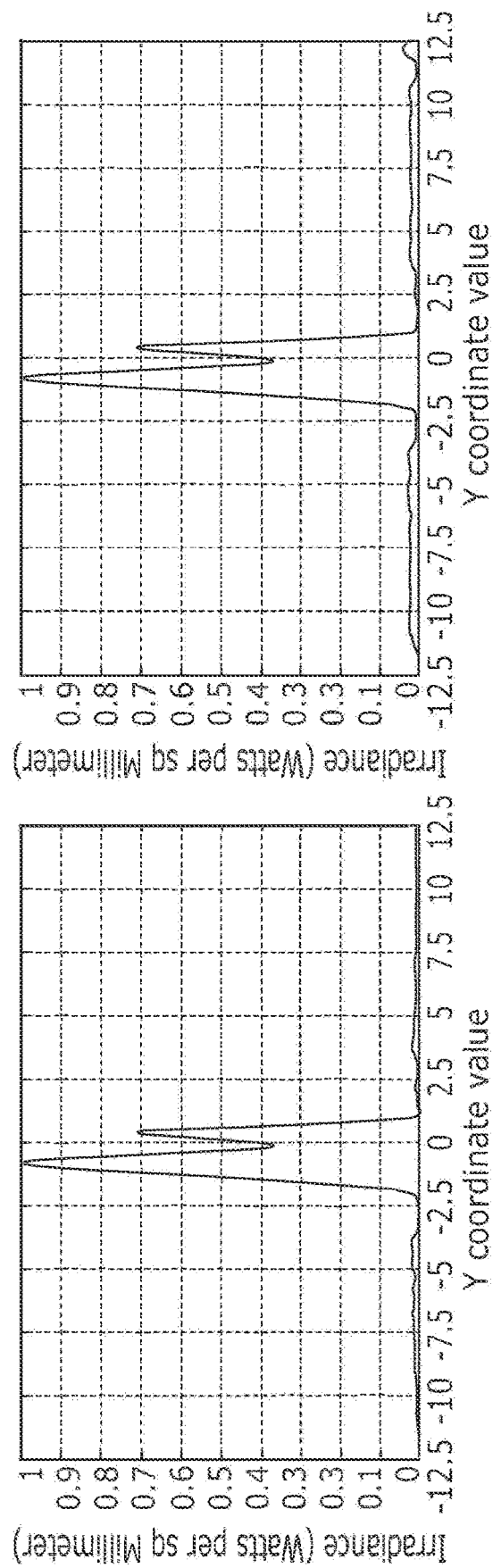
Fig. 22(b)
Fig. 22(a)

LASER-CHAIN ALIGNMENT

CROSS-REFERENCE TO RELATED APPLICATIONS

This application is a national phase application of International Patent Application No. PCT/GB2017/050603, filed Mar. 7, 2017, which claims priority to GB Patent Application No. 1604940.5, filed Mar. 23, 2016, both of which are incorporated by reference herein in their entireties for all purposes.

TECHNICAL FIELD

The present invention relates to a method of alignment of components in an optical system. For example, aspects of the invention relate to alignment of optical components in a laser chain. The present invention also relates to alignment references for use in the method.

BACKGROUND

High energy, large-aperture lasers are amplified up to their high energies by multiple passes through an amplifier or passes through multiple amplifiers. The multiple passes or multiple amplifiers result in the need to align the laser beam to multiple components. An offset in the alignment of the beam at an early stage of the amplification process can result in loss of the beam or loss of energy which is amplified at each pass. Another possibility is that the offset in alignment may result in unwanted intensity profile modulations, which, when amplified, might lead to catastrophic laser-induced damage to optics downstream. The multiple components and multiple passes result in the term "laser chain" or "amplifier chain" in reference to the chain of components required to perform the multiple passes.

The use of alignment references is common practice to assist in the building of, and in the day-to-day alignment process of, laser chains. Prior art alignment references for large aperture laser chains consist of crosshairs which need to be placed at the object planes of beam diagnostic systems located downstream in the optical system. The crosshairs are monitored downstream in the optical system by beam diagnostics systems usually relying on a camera sensor, which is used to check or monitor the alignment, and additional lenses required to modify the beam size according to the size of the camera sensor. Beam diagnostic systems may be either permanently installed or temporally inserted in the laser system. Alternatively, it is possible to carry out visual inspection of the beam at suitable locations along the beam path, determined by image relaying constraints. Locations of object and image planes depend on the overall optical system, especially on focusing optics, such as lenses.

Two or more alignment references are usually placed at different locations along the beam path in such a way that, if the laser chain is properly aligned, the images of alignment references overlap on the camera sensor. If the laser chain is not aligned, appropriate optical elements are adjusted in order to achieve reference image overlap.

A simplified example arrangement employing prior-art reference crosshairs is shown in FIG. 1 and is used to highlight the limitations of prior art crosshair references. FIG. 1(a) shows the setup as it would be used in a large-aperture high energy laser chain, i.e. where a collimated beam is propagated through a series of optical components (not shown) and a spatial filter, comprising lenses L1 and L2 and a pinhole P. Two crosshair alignment references (C1 and C2) are inserted in the system and their image is analysed using a beam diagnostic system comprising lenses L3 and L4 and a camera. Positioning of crosshair references C1 and C2 is determined by image-relaying requirements, which can be appreciated from FIG. 1(b). In order to achieve a sharp image of the crosshair references on the camera sensor, only two locations, labelled as "object plane 1" and "object plane 2", are suitable for the positioning of the crosshair references. Numbers in FIG. 1 are provided as an example of possible distances (in mm) between optical components and are shown to help in the understanding and the identification of object and image planes. The numbers in FIG. 1 are derived from geometrical optics considerations, which derive mainly from the lens formula (one must bear in mind that this formula describes an approximated situation). The lens formula is $1/p+1/q=1/f$, where p is the distance between the object and the lens, q is the distance between the lens and the image and f is the focal length of the lens. Optical design software (such as Zemax) aid in the determination of the accurate position of the image and the object planes in optical systems. If the focal lengths of lenses are changed or the layout of the system is changed, the numbers will also change.

As can be seen in the example, the main drawback of such systems is represented by a strong limitation both on possible locations where the alignment references can be placed and on where the inspection of the beam can be carried out. Indeed, if alignment references are not placed at the object planes of the diagnostic system, a blurred image surrounded by a diffraction pattern is formed at the camera, thus preventing an accurate alignment process. For the same reason, if beam inspection is not carried out at the image plane, the images of the references become blurred. In real world systems, object and image planes may be unavailable for the positioning of crosshairs and beam diagnostics systems due to constraints related to the layout of the laser chain. It is also worth noting that nowadays many laser chains rely on spatial filters to remove random fluctuations from the beam intensity profile. In this case, alignment carried out using prior art alignment references becomes less accurate, since the high-frequency filtering performed by pinholes used in spatial filters causes blurring of the image of crosshairs placed upstream of the spatial filter (such as crosshair reference C1 in FIG. 1, which is located before the spatial filter).

"Alignment of the Twenty-Beam Shiva Laser", Energy and Technology Review, Lawrence Livermore Laboratory, December 1978, Defense Programs, Pages 1-12, describes the alignment techniques used for the Shiva laser which had 20 beamlines. The paper appears to describe a procedure relying on crosshairs to achieve alignment. Based on the figures it appears that the crosshairs could not be placed at the object plane of the diagnostic system (which is the ideal configuration when using crosshairs), and a sharp image of the crosshairs could not be achieved. Instead, only a blurred image of the crosshairs is achieved, which leads to a loss in the accuracy of the alignment process. This document therefore highlights the difficulties in using crosshairs for alignment of laser chains because it requires the system to be disturbed to include the diagnostic system and the alignment references.

SUMMARY OF THE INVENTION

The present invention relates to using diffraction patterns of alignment references to align a laser beam relative to one or more optical components. The alignment can be performed by moving and/or tilting the optical components to adjust the position and/or the direction of the laser beam downstream. The use of diffraction patterns instead of the prior art method of imaging crosshairs provides significant advantages as the alignment setup and process is no more limited by image relaying requirements. Indeed, this brings about a relevant increase in the number of possible locations in which alignment references can be placed and in which visual inspection can be carried out, and more flexibility on beam diagnostics design and positioning. By the term "alignment reference" we mean, for example, reticle, reticule graticule. The references are preferably formed of windows or apertures in a plate but may also be formed of lines etched or marked on to a transparent plate.

The present invention provides a method of aligning an optical component in a laser system, comprising:

placing a first alignment reference in the path of a laser beam upstream of the optical component, the first alignment reference having first reference features forming a first diffraction pattern when illuminated by the laser beam;

placing a second alignment reference in the path of the laser beam downstream of the first alignment reference and the optical component, the second alignment reference having second reference features forming a second diffraction pattern when illuminated by the laser beam;

illuminating the alignment references and optical component with the laser beam;

monitoring the combined diffraction pattern of the reference features of the first and second alignment references at a position downstream of the second alignment reference; and adjusting the position and/or orientation of the optical component towards the combined diffraction pattern indicating alignment of the optical component to the laser beam.

By alignment we refer to having alignment between the laser beam and the optical component. This may be coaxial alignment such that the optical axis of the optical component is aligned with the axis of the laser beam. The alignment may be achieved by the step of adjusting the position or orientation of the component or laser beam, that is, their relative position. Adjusting the relative position to bring the optical component towards alignment may include reducing the amount or degree of misalignment between the diffraction patterns or the combined diffraction pattern.

Preferably the diffraction pattern produced by the first alignment reference, second alignment reference, or their combined diffraction pattern produces a recognisable pattern, such as a cross or an "X", which can be readily identified as the optical component is brought towards alignment. This provides fine alignment control. Preferably, the first reference features are different to the second reference features, such that the first alignment reference may produce a different diffraction pattern compared to the second alignment reference. Gross alignment may be achieved by minimizing clipping of the beam at the edges of the references.

The step of adjusting the position and/or orientation of the optical component towards alignment may comprise adjusting the position and/or orientation of the optical component to improve the symmetry or centring of the combined diffraction pattern. The reference features of the first and/or second alignment references may have reflection symmetry in two orthogonal planes. These planes may be orthogonal to the beam axis. The planes may in particular embodiments comprise vertical and horizontal directions. The reference features of the first and/or second alignment references may comprise a rectangle or square. In other embodiments, the symmetry of the references may take the form of any polygonal shape. However, since the alignment will generally be achieved by adjusting the position in two orthogonal directions (because this is how optical positioners generally operate) the first and second alignment references preferably have this reflection symmetry in two orthogonal planes.

The second reference features of the second alignment reference may comprise a target window, and the step of monitoring may comprise monitoring the combined diffraction pattern enclosed by the shadow of the target window. The target window is a reference or fiducial type feature that helps in assessing the alignment.

The steps of monitoring and adjusting may comprise monitoring the combined diffraction pattern and adjusting the position and/or orientation of the optical component to bring the combined diffraction pattern towards a centring on the shadow of the target window of the second alignment reference.

The combined diffraction pattern may indicate the optical component is substantially aligned in the laser system when the combined diffraction pattern has reflection symmetry in two orthogonal directions and is centred on the shadow of the target window of the second alignment reference. The first reference features form a diffraction pattern when illuminated by the laser beam and may comprise a first target window, and the target window of the second alignment reference is a second target window. The reference features may comprise elements such as lines and target window. Preferably, the reference features, such as lines, and also the target window may be oriented horizontally and vertically, or at 45° thereto.

The step of monitoring may comprise monitoring the combined diffraction pattern enclosed by the shadows of the first and second target windows. The step of monitoring may comprise monitoring the symmetry and/or centring of the combined diffraction pattern enclosed by the shadows of the first and second target windows. When an offset is present a distortion or asymmetry in the diffraction pattern may be seen, such as a squashing or clipping of the pattern.

The first reference features may comprise first elements, such as lines, and a first target window. Both first elements and first target window may form diffraction patterns when illuminated by the laser beam. Both first elements and first target window may be used for monitoring the alignment of the optical system. The second reference features may comprise second elements, such as lines, and a second target window. Both second elements and second target window may form diffraction patterns when illuminated by the laser beam. Both second elements and second target window may be used for monitoring the alignment of the optical system.

The use of diffraction patterns instead of imaging crosshairs means that the alignment references can be placed almost anywhere along the beam path. Indeed, the alignment references do not need to be placed at an object plane and viewed at an image plane in order to perform the alignment process. Instead, the analysis of the symmetry and/or centring of the diffraction pattern produced, for example in reference to the combined shadow or diffraction patterns of the target window (and optionally elements), provides a convenient analysis method. The target windows (and elements) provide a suitable reference against which the diffraction patterns can be compared.

The alignment is that of the laser beam and one or more optical components, such that the components may be correctly centred on the beam axis.

In some embodiments only the second alignment includes a target window, or neither the first or second alignment reference includes a target window. In such a case it is simply the alignment of the diffraction patterns themselves or their alignment to a camera or viewing device which is used to set the alignment. Preferably the second alignment includes a target window so as to provide a target to assess the combined diffraction pattern. If one or other of the references does not include a target window then the alignment features may comprise lines such as a cross or "X".

If there is a large misalignment, such that the beam does not even reach the second reference, a rough adjustment of suitable optics is required to bring the beam on the second alignment reference. If the beam reaches the second reference, but the target windows are completely offset with respect to each other, relative positions of shadow of target windows and elements can be used to estimate and further correct the misalignment. When the shadows of the target windows are starting to superimpose, the diffraction pattern enclosed by the shadow of the target windows are used to carry out fine adjustment of optical components in order to achieve correct alignment.

The target window of the first and/or second alignment reference is preferably at the centre of a beam pass window in the first and/or second alignment reference. The beam pass window is a window larger than the target window and may be sized equal to or slightly greater than cross-dimensions of the laser beam. This means the laser beam when correctly aligned may pass through the beam pass window without any blocking of the beam occurring. However, in alternative embodiments, the beam pass window can be made smaller than the beam, but in such cases is preferably only slightly smaller to avoid loss of beam power.

The step of placing the first alignment reference in the path of the laser beam upstream of the optical component may comprise placing the first alignment reference in the near-field of the laser chain to be aligned, i.e. the input of the laser chain, and centring the near field on the beam pass window of the first alignment reference. This may mean positioning the beam such that it is not blocked or hindered by the edges of the beam pass window. For example, this may be centring of the laser beam cross-dimension to fit within the beam pass window of the first alignment reference. Alternatively, if the beam pass window is smaller than the beam, making sure that the beam leaking around the edges is symmetrical still allows one to determine whether the nearfield beam is centred. The first reference features may comprise first elements. The second reference features may comprise second elements. The first elements and second elements may be straight lines. Preferably, the first elements may be arranged offset by substantially 45° to the second elements about the direction of the laser beam. Other angular offsets may be used but the most distinguishable diffraction patterns may be when the offset is 45°.

The step of monitoring may comprise:
identifying a whole or part of a recognisable diffraction pattern feature, such as a cross or X, formed as a result of diffraction effects, enclosed by the shadow of the target window of the first and/or second alignment reference; and
assessing if the recognisable diffraction pattern feature (cross or X) is offset from the centre of the shadow of the target window; and
if the recognisable diffraction pattern feature (cross or X) is offset then in the step of adjusting: adjusting the position and/or the orientation of a suitable optical component to bring the recognisable diffraction pattern feature (cross or X) towards being centred on the shadow of the target window, thereby increasing alignment of the optical component.

If the symmetry of the combined diffraction pattern enclosed within the shadow of the target windows is offset vertically then tilting the optical component about its horizontal axis to bring said component into alignment, and if the combined diffraction pattern within the shadow of the target windows is offset horizontally then tilting the optical component about its vertical axis to bring said component into alignment, and if the combined diffraction pattern within the shadow of the target windows is offset both horizontally and vertically then tilting the optical component about both its vertical and horizontal axes to bring said component into alignment. If a rotation of the beam occurs between the optical component and monitoring of the diffraction pattern an offset in the correction required will be apparent. The direction of movement of the optical component required may be opposite to the direction of movement of the diffraction pattern, depending on the actual optical arrangement.

The step of monitoring may comprise sensing the combined diffraction pattern on a camera or other viewer such as a phosphor coated card or screen. The exact nature of the monitoring system may depend on the wavelength of light.

The beam pass window of the first alignment reference and/or second alignment reference may be sized to be greater than the cross-dimensions of the laser beam. This means that substantially all of the power of the laser beam can be transmitted through the beam pass window.

The laser beam cross-dimensions may be between 0.5 and 3.0 mm less than the dimensions of the beam pass window of the first alignment reference and/or second alignment reference. These dimensions are only provided as a guide for the system described herein. Other dimensions are of course possible but may result in greater clipping of the beam or less precise alignment The optical component may be a mirror, lens, pinhole, hole, aperture, amplifier, gain block, or reflection/transmission grating. In many cases the optical component may be a mirror, gain block or reflection/transmission grating. Lenses tend to only provide a small change in beam propagation direction for a small tilt in the lens. If the component is a hole or pinhole, there may also be a lens before, and a lens after the hole or pinhole, bringing the light to focus at the hole or pinhole and then collimating the beam out again after the hole or pinhole. This is discussed in more detail towards the end of this disclosure.

The step of monitoring the combined diffraction pattern may comprise measuring the intensity of the combined diffraction pattern along a line passing though the centre of the shadow of the target window and determining if the intensity is symmetric.

The method may further comprise repeating the steps of monitoring and adjusting until alignment of the whole laser chain is achieved. For the alignment of a whole laser chain or laser system, references should be suitably shifted along the beam path to check the correct positioning and orientation of optical components in the laser chain or laser system.

The present invention also provides a method of aligning a laser beam in a laser system, comprising:
placing a first alignment reference in the path of the laser beam, the first alignment reference having first reference features forming a first diffraction pattern when illuminated by the laser beam;
illuminating the first alignment reference with the laser beam;
monitoring the diffraction pattern of the reference features of the first alignment reference at a position downstream of the first alignment reference; and adjusting the relative position and/or orientation of the laser beam towards the diffraction pattern indicating alignment of the laser beam to the first alignment reference. This method may be particularly useful as a first step in aligning a laser beam or system. If the first alignment reference is maintained in position throughout the alignment process and also possibly use of the system after alignment, any deviation or movement of the beam at this near-field position can be readily detected. Without such an arrangement deviation may go unnoticed or the source of the misalignment may be more difficult to detect.

The method may further comprise placing an optical component in the path of the laser beam downstream of the first alignment reference;

placing a second alignment reference in the path of the laser beam downstream of the optical component, the second alignment reference having second reference features forming a second diffraction pattern when illuminated by the laser beam;

illuminating the alignment references and optical component with the laser beam;

monitoring the combined diffraction pattern of the reference features of the first and second alignment references at a position downstream of the second alignment reference; and adjusting the position and/or orientation of the optical component towards the combined diffraction pattern indicating alignment of the optical component to the laser beam.

As will be readily apparent the steps set out above in relation to the method of aligning an optical component in a laser system may also be applied here, subsequent to the initial steps set out here.

The present invention further provides a system of diffraction-based alignment references for aligning an optical component in a laser system, comprising:

a first alignment reference having first reference features for forming a first diffraction pattern when illuminated by a laser beam; and a second alignment reference having second reference features for forming a second diffraction pattern when illuminated by the laser beam, wherein the second reference features comprise at least a target window for monitoring the combined diffraction pattern of the reference features of the first and second alignment references so as to provide an indication of the alignment of the optical component to the laser beam.

The second alignment reference may comprise a beam pass window, the target window arranged within the beam pass window. The beam pass window is a window sized to be similar to that of the laser beam. Of course, the laser beam may be different dimensions at different places in the system, but it may be desired to use the beam pass window as a beam centring tool so as to centre the beam.

The target window may be substantially centred within the beam pass window.

The reference features of the second alignment reference may comprise lines which do not cross through the target window. The lines may comprise orthogonal lines.

The target window of the second alignment reference may be a second target window, and the first reference features may comprise at least a first target window.

The first alignment reference may comprise a beam pass window, the first target window arranged within the beam pass window of the first alignment reference. The first target window may be substantially centred within the beam pass window of the first alignment reference. The reference features of the first alignment reference may comprise lines which do not cross through the first target window. The lines of the first alignment reference may comprise orthogonal lines.

The lines may preferably be straight lines.

Beam pass windows of the first and second alignment references may be the same shape as each other.

The beam pass windows of first alignment reference and second alignment reference may be square, rectangular or circular (or any other shape that best suits the beam spatial profile propagating through the laser chain). The target windows may be the same shape as the beam pass windows, but smaller in size (or also of different shape).

The beam pass windows of the first and second alignment references may be non-circular, such as square or rectangular, and when the beam pass windows are aligned by said shape, the first orthogonal elements may be offset by 45 degrees to the second orthogonal elements. That means that the orthogonal elements and the target windows may be rotationally offset about the beam axis.

The target window of the first alignment reference may be separated from the beam pass window by a boundary line forming the edge of the target window. The boundary line may be a square loop or the outline of a square, or other shape. The boundary line may terminate the first orthogonal elements such that target window is not crossed by the first orthogonal elements.

The target window of the second alignment reference may be separated from the beam pass window by a boundary line forming the edge of the target window. The boundary line may be a square loop or outline of a square. The boundary line may terminate the second orthogonal elements such that target window is not crossed by the second orthogonal elements.

The first target window and second target window may be square, rectangular or circular.

The boundary line of the first alignment reference may form the same shape as the boundary line of the second alignment reference.

The first and second alignment reference may be each comprised of a plate having a first portion for mounting the device and a second portion in which the reference feature, beam pass window and/or target window are formed.

The present invention further provides a laser system comprising:

the system of diffraction based alignment references set out above; and a laser adapted to generate a laser beam having cross-dimensions no greater than the dimensions of the beam pass windows of first alignment reference device and second alignment reference device. The laser beam cross-dimensions may be between 0.5 and 3.0 mm less than the dimensions of the beam pass windows of first alignment reference and second alignment reference. As mentioned above, other dimensions can also be used.

The present invention provides a system of diffraction-based alignment references for aligning an optical component in a laser system, comprising:

a first alignment reference having first reference features for forming a first diffraction pattern when illuminated by a laser beam; and a second alignment reference having second reference features for forming a second diffraction pattern when illuminated by the laser beam.

Other feature set out above, may be included in combination with these features so as to provide suitable alignment of the laser beam.

The present invention provides an alignment reference having a beam pass window and orthogonal elements dividing the beam pass window, the orthogonal elements for forming a diffraction pattern when illuminated by the laser beam, the alignment reference having at the centre of the beam pass window a target window for monitoring the alignment of an optical component, wherein the orthogonal elements do not cross the target window.

The above-described methods and apparatuses are generally directed to use with high power, large aperture laser systems. However, the above-described methods and apparatuses may also find applications in other systems where condition allowing diffraction effects are satisfied. Some examples of possible applications are:

laser systems for pump/probe spectroscopy;
alignment telescopes;
autocollimators (similar to alignment telescopes, but focused at infinity)—also called theodolites;
alignment of lasers used for guiding star applications;
alignment of synchrotron UV radiation.

Accordingly the present invention provides a method of aligning one or multiple optical components in a system, comprising:

placing a first alignment reference in an optical path, the first alignment reference device having first reference features forming a diffraction pattern when illuminated;

placing a second alignment reference in the optical path downstream of the first alignment reference and one or multiple optical components, the second alignment reference device having second reference features forming a diffraction pattern when illuminated;

illuminating the alignment references with the beam;

monitoring the combined diffraction pattern of the reference features of the first and second alignment references at a position downstream of the second alignment reference; and adjusting the position of suitable optical components towards achieving the combined diffraction pattern indicating alignment of the optical component to the optical path.

Many of the above-described optional aspects are also applicable to this method.

The present invention also provides a system of diffraction based alignment references for aligning one or more optical components in a system, comprising:

a first alignment reference having first reference features, such as a pass window and first orthogonal elements dividing the pass window, the first reference features for forming a diffraction pattern when illuminated by light or radiation, the first alignment reference may have at the centre of the pass window a first target window for monitoring the alignment of an optical component; and a second alignment reference having second reference features, such as a pass window and second orthogonal elements dividing the pass window, the second orthogonal elements for forming a diffraction pattern when illuminated by light or radiation, the second alignment reference may have at the centre of the pass window a second target window for monitoring the alignment of an optical component.

Preferably, the first orthogonal elements do not cross the first target window and the second orthogonal elements do not cross the second target window, so as to provide clear aperture for monitoring diffraction patterns.

Many of the above-described optional aspects are also applicable to this system.

BRIEF DESCRIPTION OF THE DRAWINGS

Embodiments of the present invention and aspect of the prior art will now be described with reference to the accompanying drawings, of which:

FIGS. 1a and 1b are schematic diagrams illustrating the positioning of cross-hairs in a laser system according to the prior art;

FIGS. 8a and 8b show a comparison of simulated and measured diffraction patterns for an aligned laser beam;

FIGS. 9a and 9b show a comparison of simulated and measured diffraction patterns for a laser beam that is misaligned by 350 μm on the second alignment reference;

FIGS. 17a, 17b and 17c show the effect of pinhole decentring on the diffraction pattern for a laser beam without misalignment, misaligned by 500 μm and misaligned by 750 μm;

FIGS. 18a, 18b and 18c show the effect of pinhole decentring on intensity profile of the diffraction pattern along the y-axis for a laser beam without misalignment, misaligned by 500 μm and misaligned by 750 μm;

FIGS. 19a, 19b, 21a and 21b show the effect of beam profile on diffraction pattern respectively for a Gaussian beam without misalignment, a flat-top beam without misalignment, a Gaussian beam misaligned by 700 μm and a flat-top beam misaligned by 700 μm;

FIGS. 20a, 20b, 22a and 22b show the effect of beam profile on intensity profile of the diffraction pattern respectively for a Gaussian beam without misalignment, a flat-top beam without misalignment, a Gaussian beam misaligned by 700 μm and a flat-top beam misaligned by 700 μm;

DETAILED DESCRIPTION

As set out above, one of the drawbacks of the prior art methods is the limited positions in the laser system that alignment references can be placed because of the requirement that they are placed at object planes of the beam diagnostic system. This disclosure describes deliberately placing the alignment references away from object planes by using alignment references with appropriately designed shapes. The alignment is assessed by checking the superposition of diffraction patterns of the alignment references instead of the images of the alignment references. Hence, this disclosure provides a method which is not limited by relying on forming images of the alignment references thereby greatly increasing the number of possible locations in which alignment references can be placed and allowing more flexibility on beam diagnostics and visual inspection of the beam. The shape of the alignment references is specially adapted to achieve diffraction patterns that allow distinctive features to be recognised and the features to be assessed to determine the alignment of optical components. In a particular arrangement the shape of the alignment references is designed such that the resulting superposition of diffraction patterns is symmetrical if the laser chain is correctly aligned. When misalignment occurs there is a break in the symmetry of the diffraction pattern. The break in the symmetry can be characterised by a shift in the position of the distinctive feature, which preferably correlates with the misalignment of the components in the laser chain. The misalignment may also, or alternatively, be characterized by a change in the shape of the diffraction pattern. In other words, a vertical or horizontal shift in the distinctive feature may result from erroneous orientation or translational position of optical components. This may for example be a rotational or angular misalignment or a vertical or horizontal misalignment of components in the laser chain. Furthermore, the shift in distinctive features is particularly noticeable improving the accuracy of the alignment process compared to the prior art.

If the alignment has to be carried out in laser chains comprising spatial filters, the feature size of the references can be optimised according to the diameter of pinholes used for spatial filtering to avoid degradation in alignment accuracy.

Figure 2:
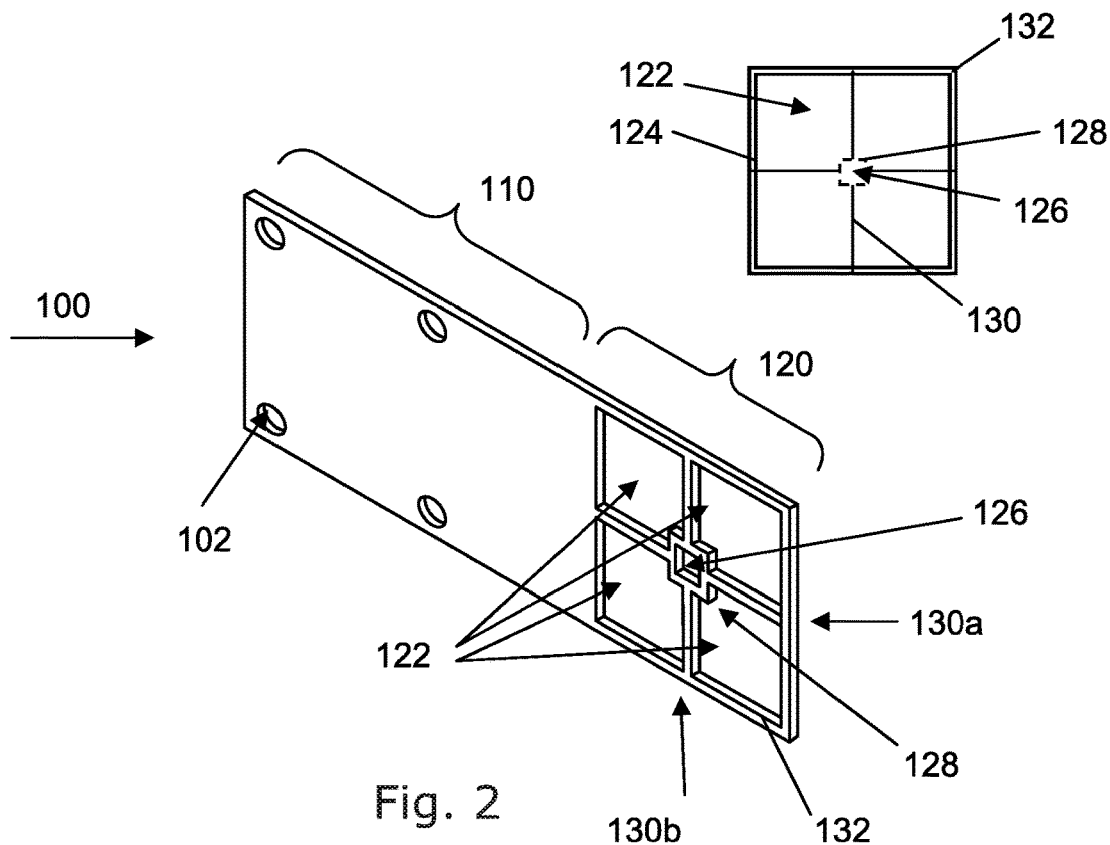
FIG. 2 is a perspective view of a first alignment reference according to the present invention.
Figure 3:
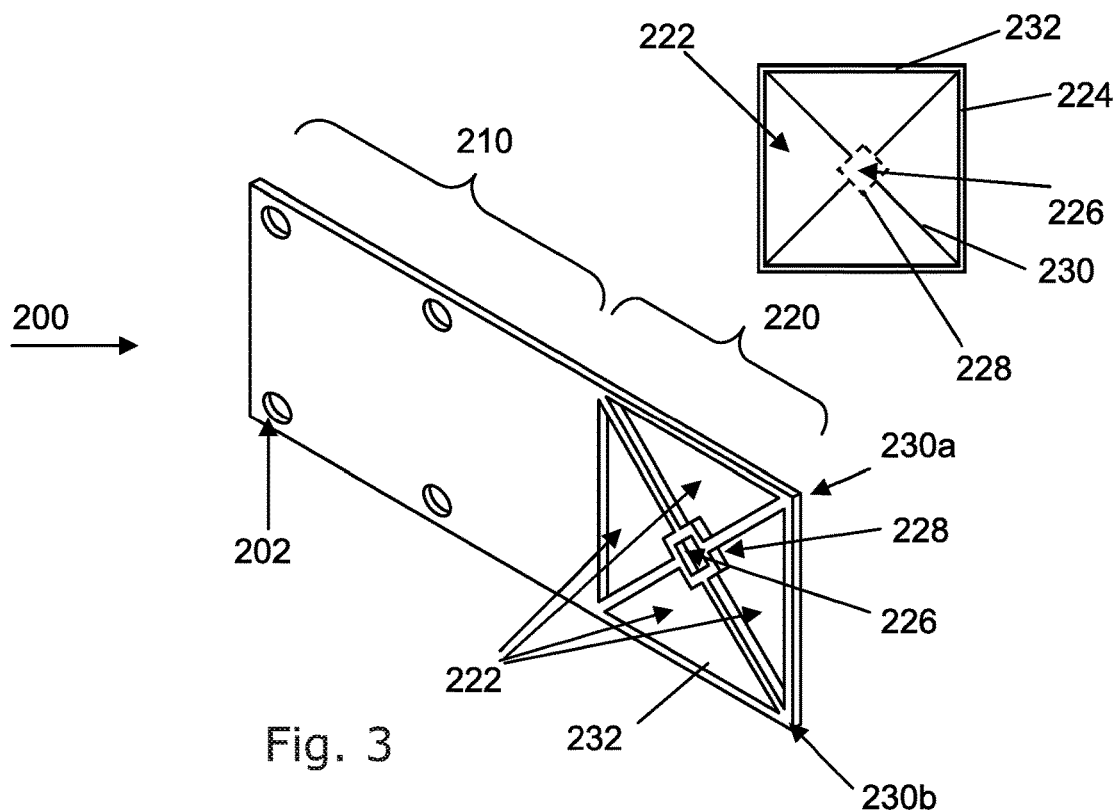
FIG. 3 is a perspective view of a second alignment reference according to the present invention.
Figure 4:
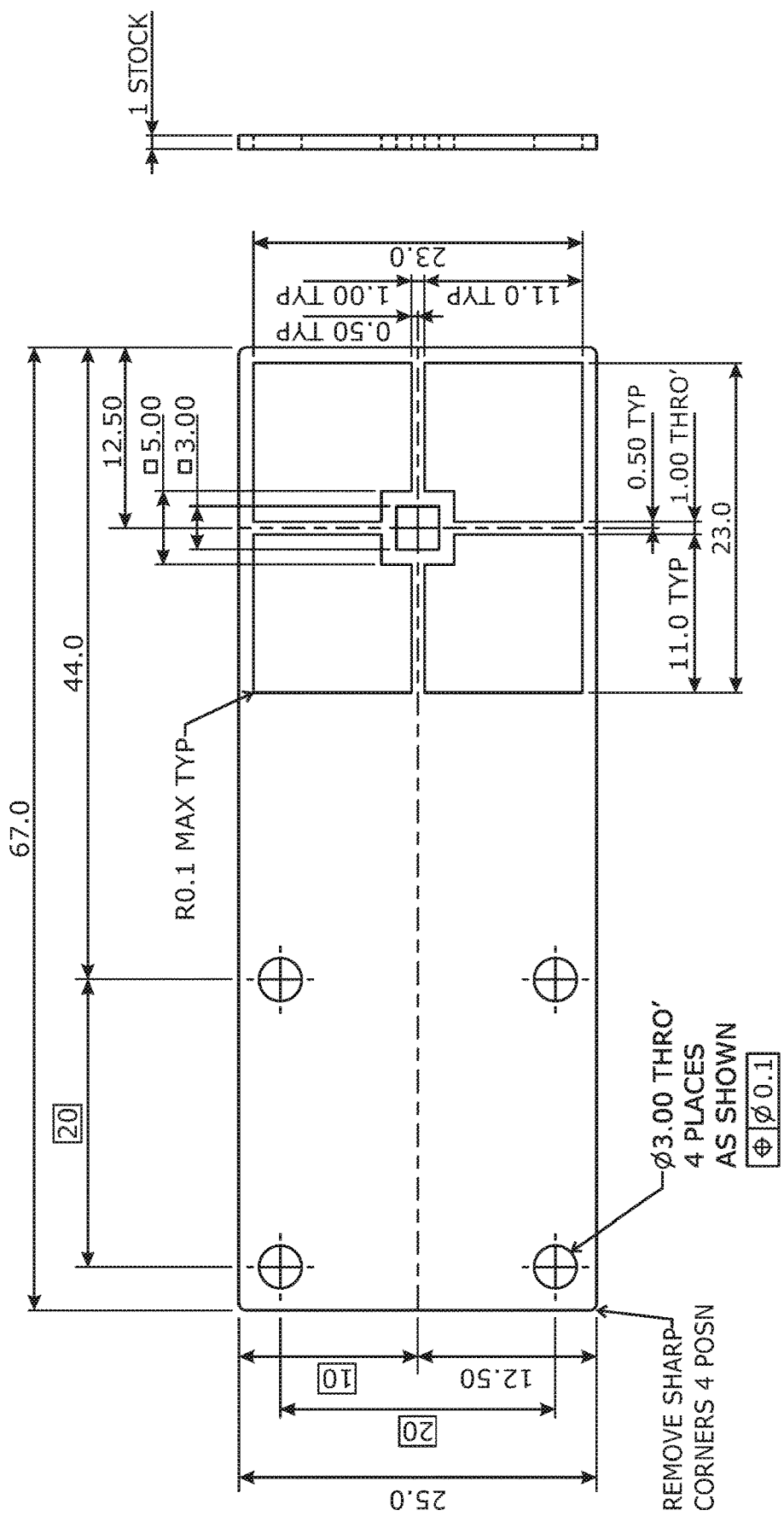
FIG. 4 is a detailed drawing showing plan and side views of a first alignment reference according to the present invention.
Figure 5:
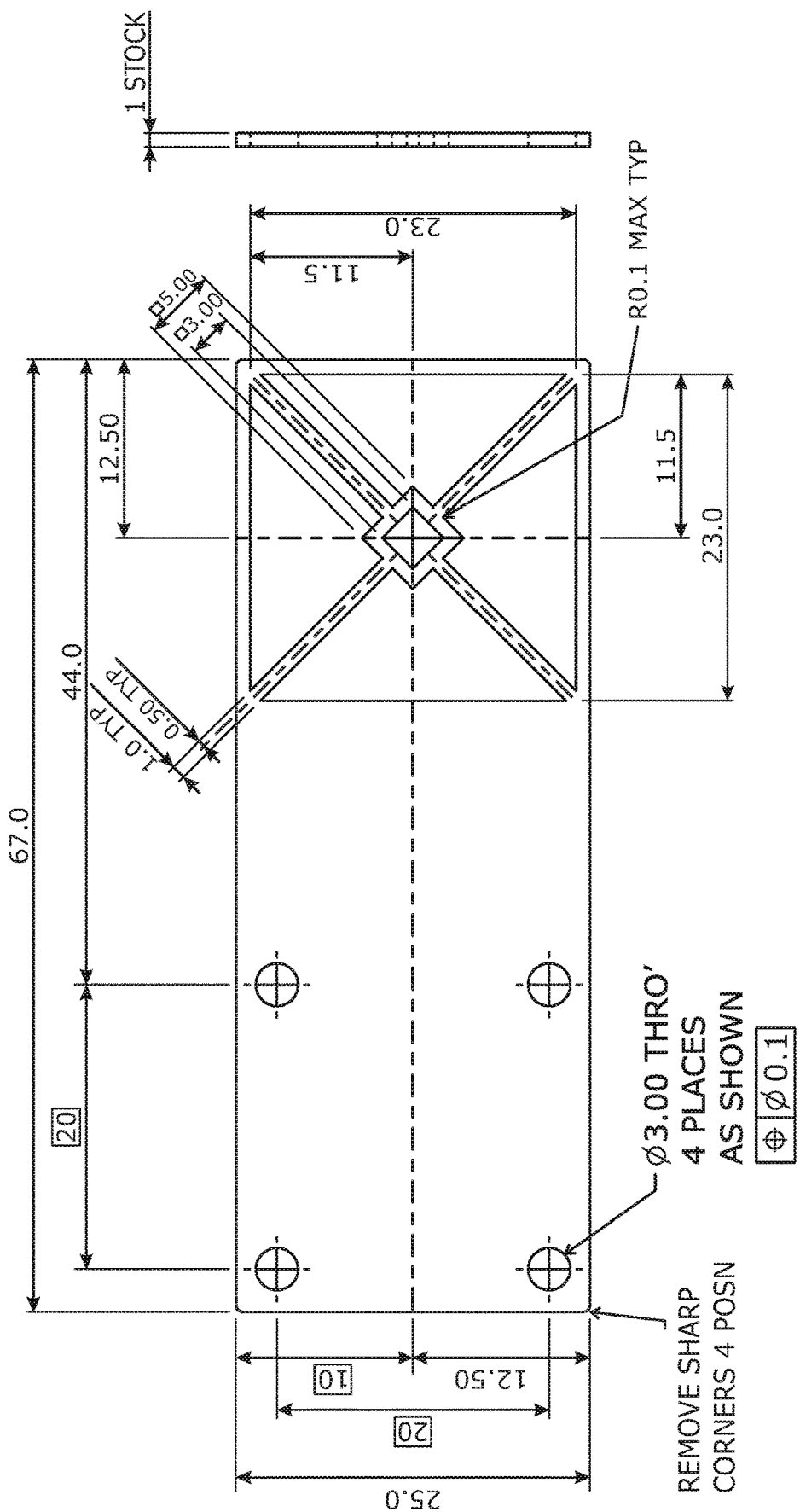
FIG. 5 is a detailed drawing showing plan and side views of a second alignment reference according to the present invention.

The method of this disclosure also allows control of the laser beam near-field position accurately. In a particular embodiment of the method one of the alignment references can be kept at a position at the input of the laser chain. The shape of the alignment reference is tailored to allow a centring of the near-field on the alignment reference. The second alignment reference can be moved along the beam path to check alignment of each optical component. Although optional, it is recommended that, in most cases, an alignment reference should be constantly kept at the input of the laser chain to provide a constant reference for the positioning of the near field, which could be shifted by misalignments occurring upstream (either a previous amplification stage or laser source). Failing to do this may prevent the detection of misalignments occurring upstream, leading to an incorrect alignment of the laser chain. FIGS. 2 to 5 are drawings of the alignment references for the method of this disclosure. FIGS. 2 and 3 are perspective views of the two alignment references. FIGS. 4 and 5 are drawings in plan and side view of the first and second alignment references respectively.

The alignment reference 100 of FIG. 2 is formed of a plate having a first portion 110 for mounting and a second portion 120 comprising the alignment reference features. The first portion 110 may have a number of holes 102 for receiving bolts or other fasteners for fixing to a mount. In some embodiments the plate may not include a first portion for fastening. For example the alignment reference could be post mounted or held in other ways. However, by the plate having a first portion 110 for mounting, the alignment reference can be conveniently mounted to a magnetic base for mounting in the laser system where required.

The alignment reference 100 can be considered to comprise a beam pass window 122 through which most of the power of the laser beam passes. In the inset of FIG. 2 the beam pass window 122 is shown as the area enclosed by the outer square drawn with double lines 124. The beam pass window 122 may be sized and shaped to approximately match the size (or be slightly bigger than) and shape of the laser beam. In the present configuration shown in FIG. 2 the beam pass window is square but other shapes such as rectangles and circles are possible. In the inset of FIG. 2 the alignment reference 100 further comprises a target window 126 represented by the area enclosed by dashed lines 128. As shown, the target window 126 may be the same shape as the beam pass window 122 but is of smaller size. The target window 126 is preferably centred in the beam pass window 122. In the inset of FIG. 2 the beam pass window 122 is divided into four by elements or lines 130. In the main part of FIG. 2 the beam pass window 122, target window 126 and elements 130 are also shown. The elements 130 are shown as comprised of a pair of horizontal elements 130a and a pair of vertical elements 130b which meet the edge of the target window 126 but do not cross the target window and do not meet each other. The elements 130 are arranged orthogonally and if extended across the target window would meet at its centre. The elements can be considered arranged such that one element 130a is arranged parallel to the orientation (lengthwise direction) of the mounting of alignment reference 100 as a whole, and elements 130b orthogonal to the orientation. The elements instead of meeting each other are terminated at the boundary of the target window. The boundary of the target window is formed by a line 128 which we refer to as boundary line. Alternative embodiments may include more or less elements, and/or elements arranged differently around the target window. Features forming a diffraction pattern, such as a recognisable diffraction pattern may include the elements and/or target window.

FIG. 3 shows a second alignment reference 200. The second alignment reference is also formed of a plate having a first portion 210 for mounting and a second portion 220 comprising the alignment reference features. The first portion 210 may have a number of holes 202 for receiving fasteners. Similarly to the first alignment reference 100, the second alignment reference 200 also has a beam pass window 222, target window 226 and elements 230. Many of the features of the second alignment reference 200 are similar to those of the first alignment reference 100. As shown in the inset of FIG. 2 the beam pass window is represented by the area enclosed by double lines 224. Target window is represented by the area enclosed by dashed lines 228. Again the elements do not cross the target window 226. Different to the first alignment reference 100 is the orientation of the elements 230 of the second alignment reference 200. As shown in FIG. 3 the elements 230 are arranged diagonally to the orientation of the alignment reference as a whole. Element 230a is arranged at 45° to the vertical and horizontal directions (lengthwise orientation of the reference) and the element 230b is arranged orthogonal to element 230a. The target window 226 is also aligned with the elements at 45° to the lengthwise direction of the reference. Hence, when the alignment references 100 and 200 are aligned to each other such that their outlines overlap then the target window 126 and elements 130 of the first alignment reference are arranged at 45° to the target window 226 and elements 230 of the second alignment reference.

As for the alignment reference of FIG. 2, the alignment reference of FIG. 3 may include, in alternative embodiments, more or less elements, and/or elements arranged differently around the target window.

Although FIGS. 2 and 3 show the beam pass windows and target windows as squares other shapes are possible. In the embodiments shown the windows are shown as square to fit the shape of the laser beam. However, if the laser beam has a non-square cross-section then the shape used could be different such as rectangular or circular to fit correspondingly shaped beam. Furthermore, in embodiments the shape of the target window does not have to be the same as the shape of the beam pass window. For example, the beam pass window may circular and the target window could be square or vice versa.

The alignment features of the references, namely the elements 130, 230 and boundary lines 128, 228 forming the target window may be formed as a narrow line of metal. This may be formed by cutting or etching out windows in the plate. The edge of the beam pass windows 122, 222 is bordered by a line which is formed in a similar manner. This is represented by reference numbers 132 and 232 in FIGS. 2 and 3. In an alternative arrangement the elements and lines may be formed of wires. The target window is the main feature that results in providing the diffraction patterns, although the elements also contribute.

In a further alternative arrangement the elements and lines may be etched or marked on to a transparent plate such as a glass plate. For a transparent plate it is possible that the elements 130, 230 could be omitted since one of their functions is to support the target window at the centre of the alignment reference. If elements were not present, only the diffraction patterns generated by the target windows would be used.

Alignment references are designed taking into account the shape and dimension of the laser beam, the wavelength of light, and characteristics of the setup in which the alignment references are employed. Scaling laws can be followed to determine the size of the target window if the wavelength of light is modified.

The drawings of FIGS. 4 and 5 show dimensions of the alignment references 100 and 200 according to an embodiment. In this embodiment the alignment references were designed for 1030 nm light and for use at the DiPOLE laser of the applicant. The dimensions were selected for a laser chain amplifying a square 21.5 mm×21.5 mm beam. The wavelength of the light making up the beam is 1030 nm. The features of the alignment references are set to take into account the presence of spatial filters along the beam path. The spatial filters have a pinhole diameter of 2 mm. As can be seen in the figure the central target window in both cases has dimensions of 3.0 mm×3.0 mm. The relationship between pinhole size, the target aperture size and the width of the lines forming the target window and the elements is not straightforward because both pinhole size and overall laser chain design affect the size of the target windows and the width of the lines. More information on target window size versus pinhole size is given towards the end of the description in the section "Effect of Pinhole Size". In FIGS. 4 and 5 the width of lines forming the elements and the windows is 1.0 mm.

The drawings of FIGS. 4 and 5 also show the dimensions of the beam pass window as 23.0 mm×23.0 mm. As mentioned above, this is for a 21.5 mm×21.5 mm square beam. Hence, the window is only 1.5 mm larger in width and height than the beam. By having the window the same or slightly larger dimension than the beam this allows the window itself to be used to centre the beam.

FIGS. 4 and 5 specify a plate thickness of 1 mm formed of stock such as ground flat stock which is a precision type of manufactured plate. However, other materials for manufacturing the plate are possible.

Figure 6:
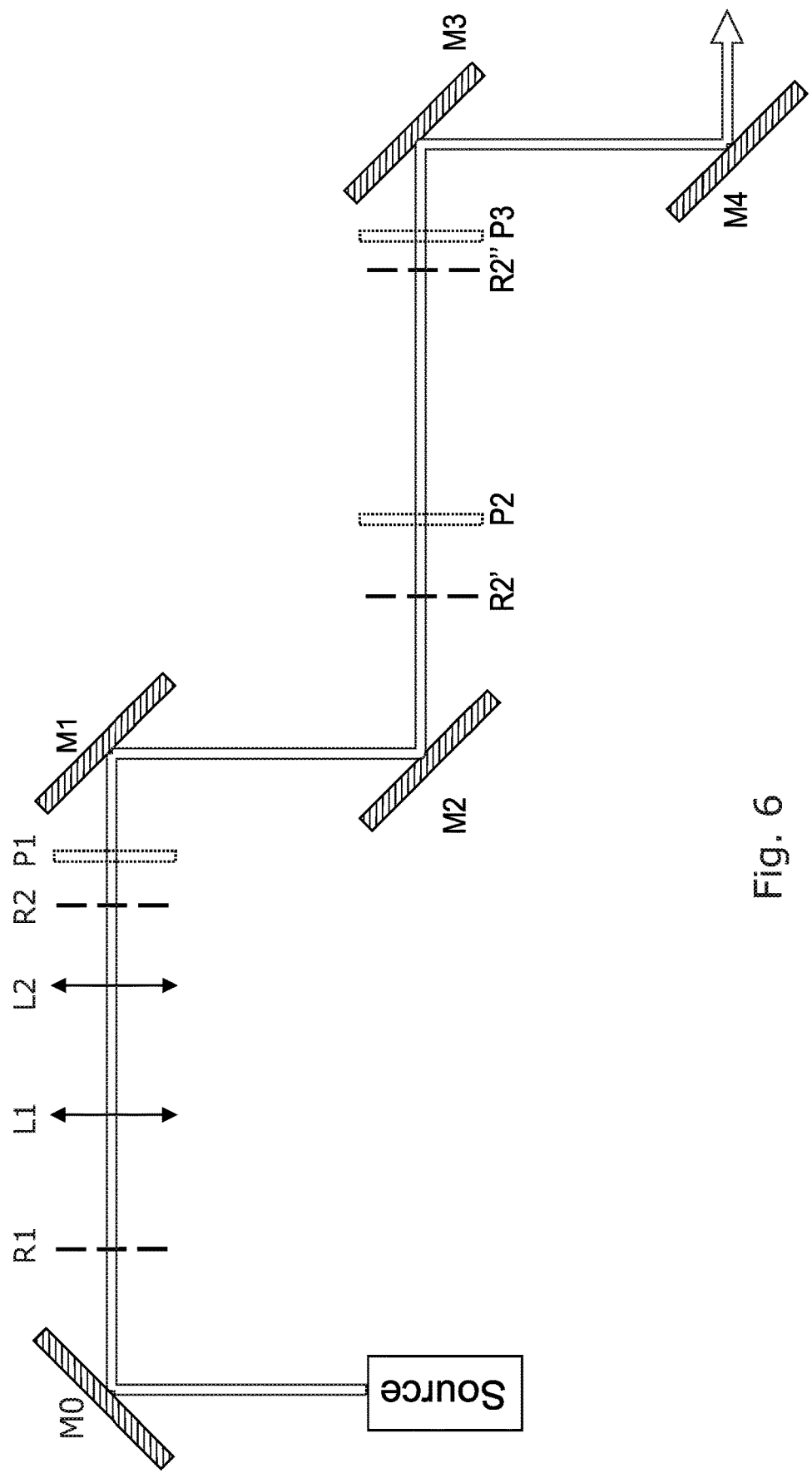
FIG. 6 is a schematic diagram illustrating the possible positioning of the first and second alignment references according to the present invention.

FIG. 6 shows an example arrangement of optical components in a laser system. The laser source is indicated followed by a mirror M0 and first alignment reference R1. The first alignment reference may correspond to alignment reference 100 shown in FIGS. 2 and 4 (although it could equally correspond to alignment reference 200 shown in FIGS. 3 and 5). Alignment reference R1 may be placed in the near-field of the source to control the near-field beam position. For example, if the required near-field position of the beam is known then the reference can be positioned to meet this and the near-field position of the beam can be adjusted until the beam passes cleanly though the beam pass window of R1. If the beam is not aligned correctly and fails to pass cleanly through the beam pass window a diffraction pattern caused by the beam hitting the edge of the window will be seen further down the beam and can be monitored by a camera. Correct centring of the beam near-field on the alignment reference is achieved by adjusting optics located between the source and mirror M0 (not shown in FIG. 6) or by adjusting the source itself. For correct alignment of the laser chain, it is recommended to keep an alignment reference at the input of the laser chain (beam near-field) as this provides information on correct alignment of previous stages. Failing to do this might prevent the detection of misalignments occurring upstream, leading to an incorrect alignment of the laser chain. Once correct centring of the beam near-field on the alignment reference has been achieved, second alignment reference R2 is placed in the system as shown in FIG. 6. The beam may be monitored at position P1 after the alignment reference R2. The shape of the alignment references results in the diffraction pattern having recognisable and characteristic features, For the case of references 100 and 200 described above, the characteristic is an "X" in the diffraction pattern which, if the laser chain is correctly aligned, is centred on the shadow of the target windows. If mirror M0 is not correctly aligned, the diffraction pattern is not symmetrical. The resulting diffraction pattern indicates to the user how mirror M0 should be adjusted. This technique allows highly accurate alignment of the optical component. Mirror M1 is a mirror or other reflecting element. To align this component, the second reference R2 is moved from its original position to a position R2'. Again, mirror M1 is adjusted until the characteristic diffraction pattern is centred on the shadow of the of the target window outline. This diffraction pattern can be assessed by moving a diagnostic system or by carrying out visual inspection in position P2, after reference R2'. Adjustment of mirror M2 can be carried by moving the second reference, for example, to R2" position, and by carrying out beam inspection at position P3. Alignment of downstream optics should be similarly carried out by shifting the second reference to appropriate positions along the beam path.

The first alignment reference may be maintained in the near field of the laser chain to provide an indication on the correct positioning of the beam at the input of the laser chain.

Figure 7:
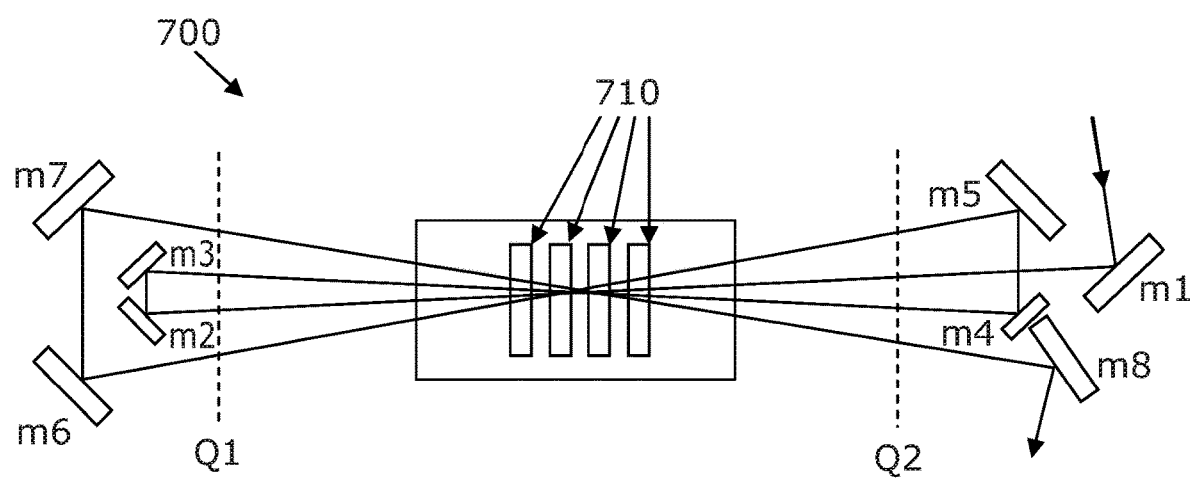
FIG. 7 is a schematic diagram of a multi-pass laser amplifier.

FIG. 7 shows an example of a multi-pass amplifier 700 for a laser system. The amplifier comprises four discs 710 of active material such as $Yb^{3+}$-doped YAG and the laser beam passes through the discs four times in a bow-tie configuration. The multiple passes and bow-tie configuration is achieved by a series of mirrors m1-m8. Alignment of the mirrors in this arrangement is important in order to achieve stable amplification. Increasing the number of passes to obtain greater powers would increase the number of mirrors and emphasises the need for a convenient and accurate alignment technique that does not require image-relying of alignment references as in the prior art.

In FIG. 7, the beam enters the system at mirror m1 and is reflected through the amplifier material 710 to mirror m2. First alignment reference 100 may be placed in the near-field of the source (not shown) as described in the arrangement of FIG. 6. The position and alignment of mirror m1 can be adjusted and checked by placing second alignment reference 200 close to the position of mirror m2 such as at plane Q1 in FIG. 7, with camera or other monitoring device further along the beam path towards m2. Alignment is performed as above by centring the position of the characteristic feature on the target window. Once complete the second alignment reference 200 and camera are moved to a position after m3 to check the position of m2 and m3. Again second alignment reference and camera may be placed close to plane Q1. Next alignment moves to plane Q2 to check and finalise the position and alignment of mirror m3. The process continues for each of mirrors through to m8.

FIGS. 8 and 9 show a comparison of simulated and measured results. The simulation was performed using Zemax (previously known as Radiant Zemax) optical design software. Measured results were achieved at the DiPOLE 100 laboratory at the Central Laser Facility of the applicant. For both simulated and measured results, the system parameters include a laser wavelength of 1030 nm and a Gaussian beam profile. The references used are those of FIGS. 2-5. Other wavelengths, beam profiles and references can be used. An analysis of different beam profiles is provided later in the section "Effect of Changing Beam Profile".

FIG. 8 shows results for a laser chain which has been precisely aligned.

The results were achieved using a laser chain based on that of FIG. 6. The first reference was placed at the input of an amplifier chain and the second alignment reference at position R2'. A few optical components bringing the beam of an ancillary alignment laser at the input of the laser chain, followed by mirror M0, and then the first alignment reference R1 and a vacuum spatial filter (comprised of two lenses with focal length f and separated by a distance 2f with a 2 mm pinhole placed at the focal plane). The second alignment reference is placed in position R2' and a beam diagnostics system in position P2 for inspecting the beam.

FIG. 8a shows simulation result of the diffraction pattern created by alignment references 100 and 200 in a perfectly aligned laser chain. FIG. 8b shows the measured result of the diffraction pattern created by alignment references 100 and 200 in a perfectly aligned laser chain. There is good agreement between the measured and simulated results. In both cases the "shadow" of the vertical and horizontal elements 130a, 130b of the first alignment reference can be clearly seen. The shadow of the diagonal elements 230a, 230b of the second alignment reference can also been seen. The lines forming the edges of the target windows can be seen to overlapping to form an "eight pointed star" shape. Around the shadows of the elements and of the target windows, light fringes due to diffraction effects are clearly visible. At the centre of the target window is the combined diffraction pattern from the two alignment references. This has a recognisable and characteristic shape which is seen to take the form of an "X" centred in the shadow of the target window. The centring indicates that alignment has been achieved.

FIGS. 9a and 9b respectively show simulated and measured diffraction produced when the beam on the second alignment reference is shifted by 350 µm due to a misalignment in mirror M1. Here the various elements and target window boundaries can be clearly seen. In the simulated version the offset of the characteristic "X" feature in the centre of the target windows is apparent. The centre of the "X" is aligned below the horizontal element. The "X" is shifted vertically downwards from the centre. This indicates a vertical misalignment between the second reference and beam.

Figure 10A:
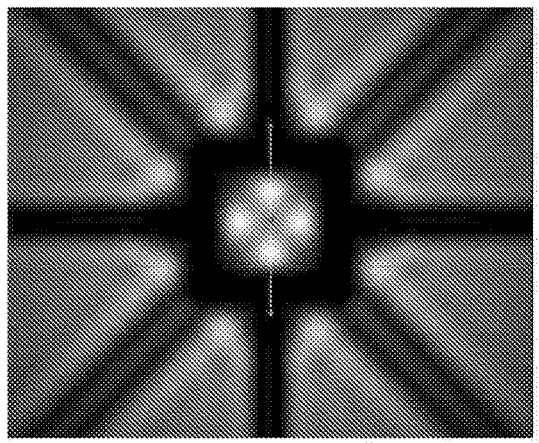
FIGS. 10a and 10b respectively show the diffraction pattern for an aligned laser beam and the intensity profile though the centre of the diffraction pattern.
Figure 10B:
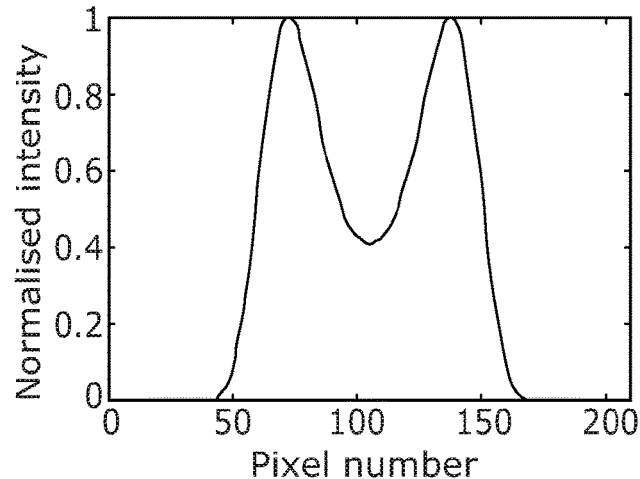

Further misalignment results are shown in FIGS. 10-12. FIG. 10 shows in FIG. 10a part of the same simulated result as shown FIG. 8a for an aligned system, but the central region is magnified in FIG. 10a to emphasize the symmetry of the "X" feature in comparison to the target window. FIG. 10b is a graph of normalised intensity taken along the vertical white line across the target window of FIG. 10a. The normalised intensity plot shows two evenly spaced and sized peaks in intensity. These represent the two light triangles or segments in the top and bottom parts of the "X". In FIG. 10b the centre of the dip between the peaks, which is at about 0.4 to 0.5 relative intensity, represents the intensity minimum at the centre of the "X".

Figure 11A:
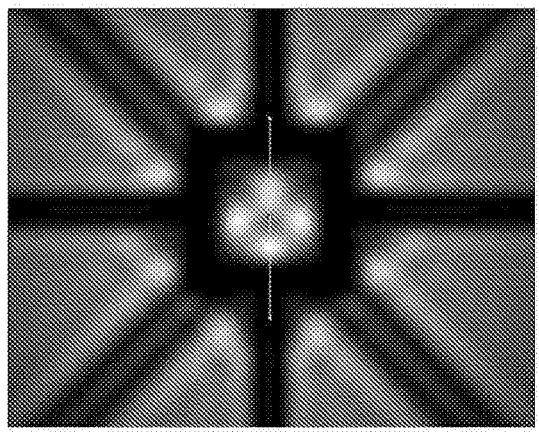
FIGS. 11a and 11b respectively show the diffraction pattern for a laser beam misaligned by 350 μm and the intensity profile though the centre of the diffraction pattern.
Figure 11B:
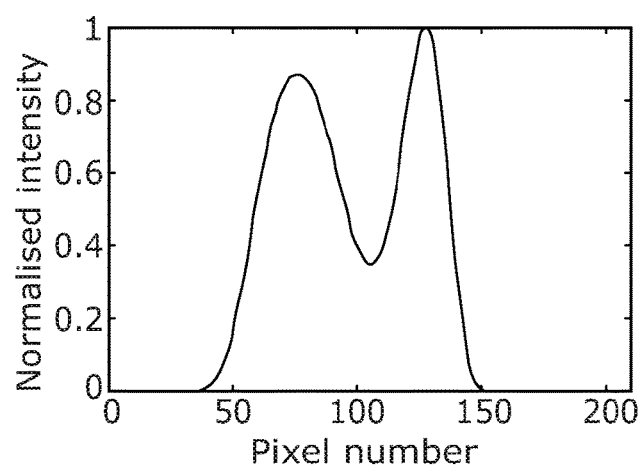

FIG. 11a is a magnification of FIG. 9a which is the simulated result for a 350 µm offset. FIG. 11b is graph of normalised intensity taken along the vertical white line across the target window of FIG. 11a. Similarly to FIG. 10b there can be seen two peaks representing the two light segments in the top and bottom parts of the "X" feature. However in FIG. 11b the peaks are not equal. The left hand peak does not reach as high intensity as the right hand peak and the left hand peak is more spread out. The left hand peak represents the light segment in the upper part of the "X". This diffraction pattern indicates a vertical misalignment of the beam.

Figure 12A:
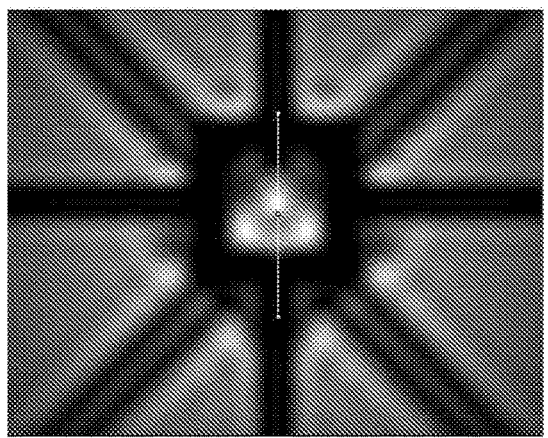
FIGS. 12a and 12b respectively show the diffraction pattern for a laser beam misaligned by 700 μm and the intensity profile though the centre of the diffraction pattern.
Figure 12B:
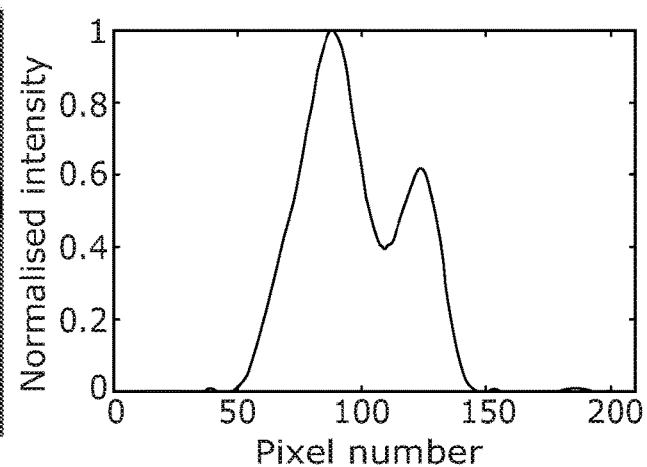

FIG. 12 represents a 700 µm misalignment of the beam on the second reference, due to misalignment of mirror M1. In FIG. 12a the bottom half of the "X" is not so clearly visible as in FIGS. 10a and 11a because it is becoming obscured by the offset in the target windows. The horizontal/vertical oriented target window can be seen to be offset upwards in comparison to the diagonal arranged target window. In FIG. 12b the right hand peak has significantly lower intensity compared to the left hand peak. The left hand peak can be seen to represent the brighter and wider upper light segment of the "X" feature in the target window. Based on FIGS. 11b and 12b it can be seen that the 700 µm (FIG. 12) shift is in the opposite direction compared to the 350 µm shift (FIG. 11).

Based on the above it can be seen that processing of the diffraction pattern could be performed by sampling the pattern on a camera. The shape of the intensity plot or variation across data sample file can be correlated to an alignment offset and used to output a correction value for repositioning an optical element. The output could be passed to a user or sent directly to a motion control device to automatically adjust the position of the optical element.

Figure 13A:
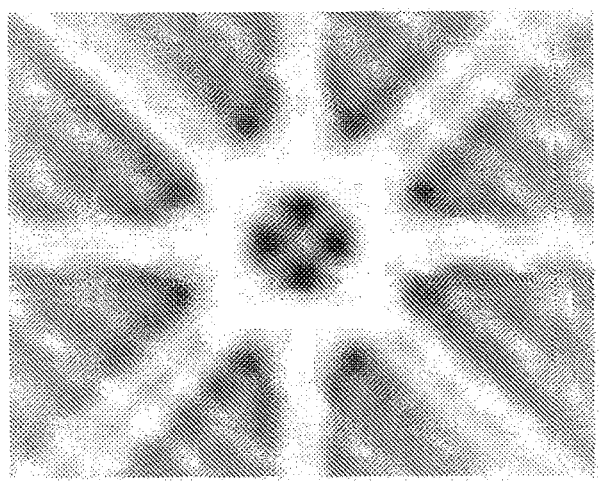
FIGS. 13a, 14a and 15a respectively show the diffraction pattern for a laser beam without misalignment, misaligned by 350 μm and misaligned by 700 μm, with inverted grayscale.
Figure 13B:
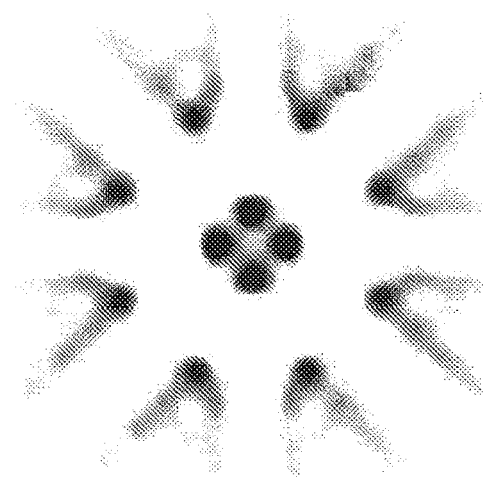
FIGS. 13b, 14b and 15b respectively show the diffraction pattern for a laser beam without misalignment, misaligned by 350 μm and misaligned by 700 μm, shown in inverted grayscale and contrast enhancement.
Figure 14A:
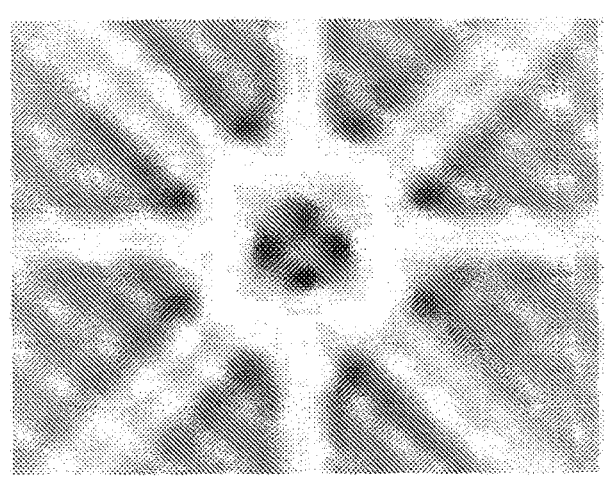
Figure 14B:
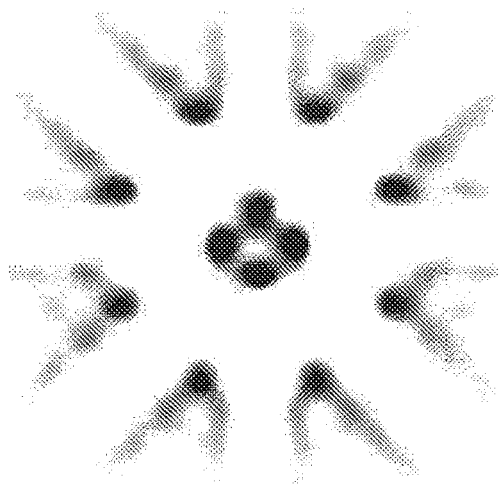
Figure 15A:
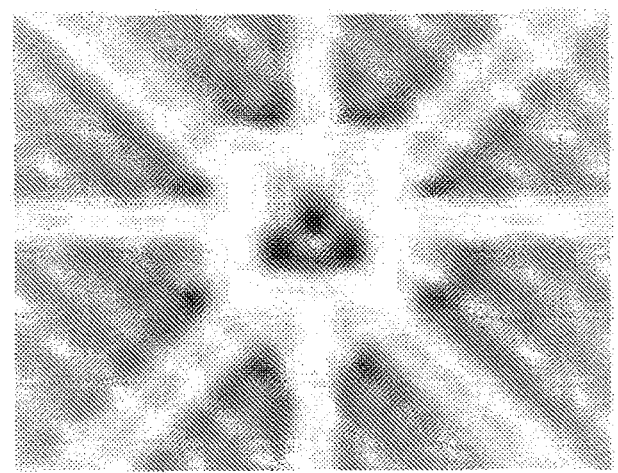
Figure 15B:
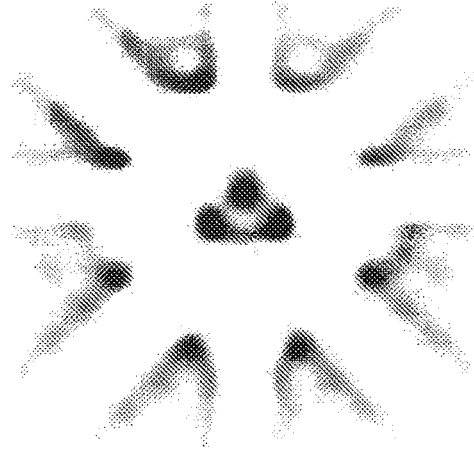

FIGS. 13a-15b show other ways of illustrating the offset. FIGS. 13a and 13b are the same image as in FIG. 10a (no offset) but in inverted grayscale. FIG. 13b also includes some contrast enhancement processing to more clearly show the "X" feature. FIGS. 14a and 14b are the same image as in FIG. 11a (350 μm offset) but in inverted grayscale. FIGS. 15a and 15b are the same image as in FIG. 12a (700 μm offset) but in inverted grayscale. FIGS. 14b and 15b also include some contrast enhancement processing.

The above-described alignment references are an exemplary embodiment. In other embodiments the elements of the first reference could be offset from the vertical and horizontal, for example by 5 or 10°. The elements d the second alignment reference would be correspondingly offset from the diagonal. It is preferable that the elements of the two references remain at 45° to each other, although less efficient embodiments can be envisaged where other offsets apply.

In these or other embodiments the target windows may take different shapes.

As mentioned above the alignment references could be comprised of lines etched or marked on to transparent plates such as glass plates.

The above-described methods and apparatuses are generally directed to use with high power, large aperture laser systems. However, the above-described methods and apparatuses may also find applications in other systems where conditions allowing diffraction effects are satisfied. Some examples of possible applications are:

laser systems for pump/probe spectroscopy;
alignment telescopes;
autocollimators (similar to alignment telescopes, but focused at infinity)—also called theodolites;
alignment of lasers used for guiding star applications;
alignment of synchrotron UV radiation.

Centring of Laser Beam on Pinholes

The applicant has investigated both theoretically and experimentally the use of diffraction-based alignment references for assessing and aiding the correct centring of a laser beam on pinholes. In the case of the DiPOLE laser system, pinholes are used for spatial filtering purposes. However, other systems may use pinholes for different purposes.

Correct centring of beam on pinholes is a requirement to ensure correct propagation of the beam along the laser chain and to perform correct spatial filtering. Failing to do this may result in energy losses and degradation of the beam profile.

Figure 16:
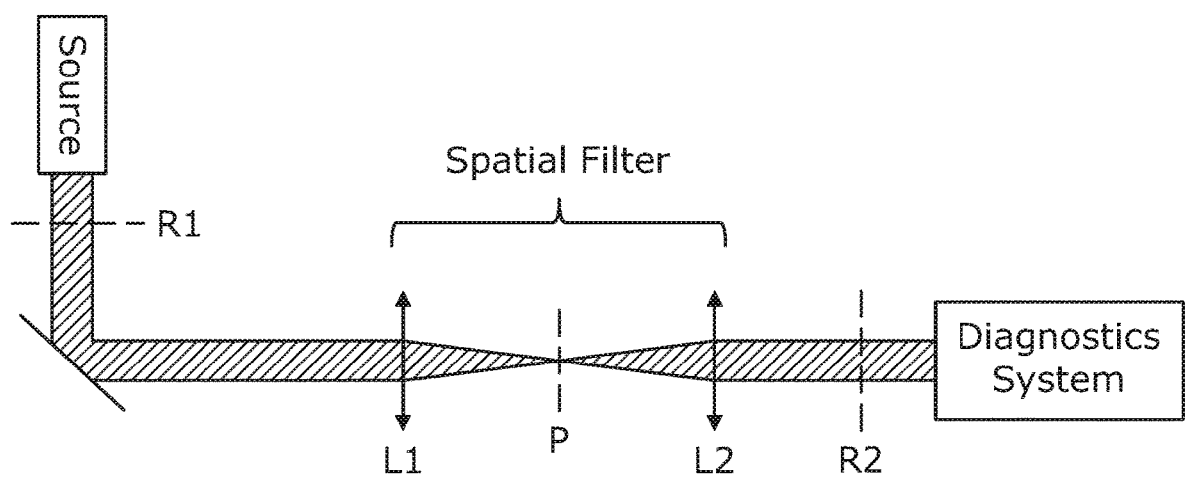
FIG. 16 is a schematic diagram illustrating a simplified setup for centring a beam on a pinhole.

The procedure for checking the centring of the beam on pinholes is carried with an arrangement such as that of FIG. 16. FIG. 16 includes a source producing a laser beam. The beam is first directed to mirror M1 and then through a spatial filter. The spatial filter comprises a pinhole positioned between a pair of lenses. A diagnostic system is placed after the output of the second lens. The steps for the procedure are as follows:
1. Align all the components of the laser chain between the source and mirror M1 (such components are not shown in FIG. 16);
2. A first alignment reference R1 should be ideally kept at the input of the laser chain to be aligned (other positions before mirror M1 are anyway allowed);
3. Position a second reference R2 after the spatial filer system (this could be optional and it is possible to rely on the diffraction pattern generated by the first alignment reference);
4. Check the resulting diffraction pattern.
If the beam is correctly centred on a 2 mm diameter pinhole, the diffraction pattern is symmetrical and is reported in FIGS. 17(a) and 18(a). Incorrect centring leads to a break in the symmetry of the diffraction pattern, as shown in FIGS. 17(b), 18(b) and 17(c), 18(c). FIGS. 17(b) and 18(b) show the effect of a pinhole decentered in vertical direction by 0.5 mm. FIGS. 17(c) and 18(c) show the effect of a pinhole decentered in vertical direction by 0.75 mm.

Effect of Changing Beam Profile

The applicant carried out a simulation to show that diffraction-based alignment references can be successfully used with different kinds of beam profiles. Beam profiles investigated were Gaussian beam profile (used for figures up to FIG. 18 in this disclosure) and flat-top beam profile. Assuming correct alignment of the laser chain in both cases, resulting diffraction patterns are compared in FIGS. 19 and 20.

Figure 19:
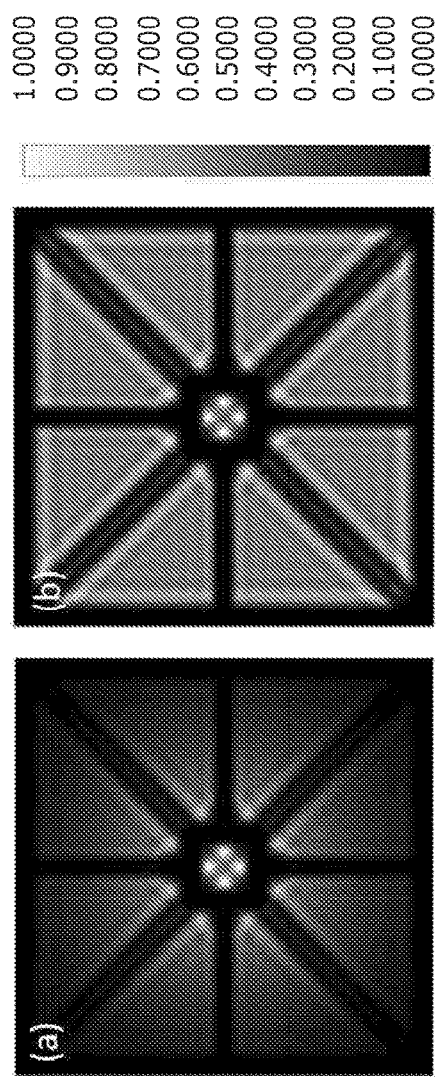
Figure 20:
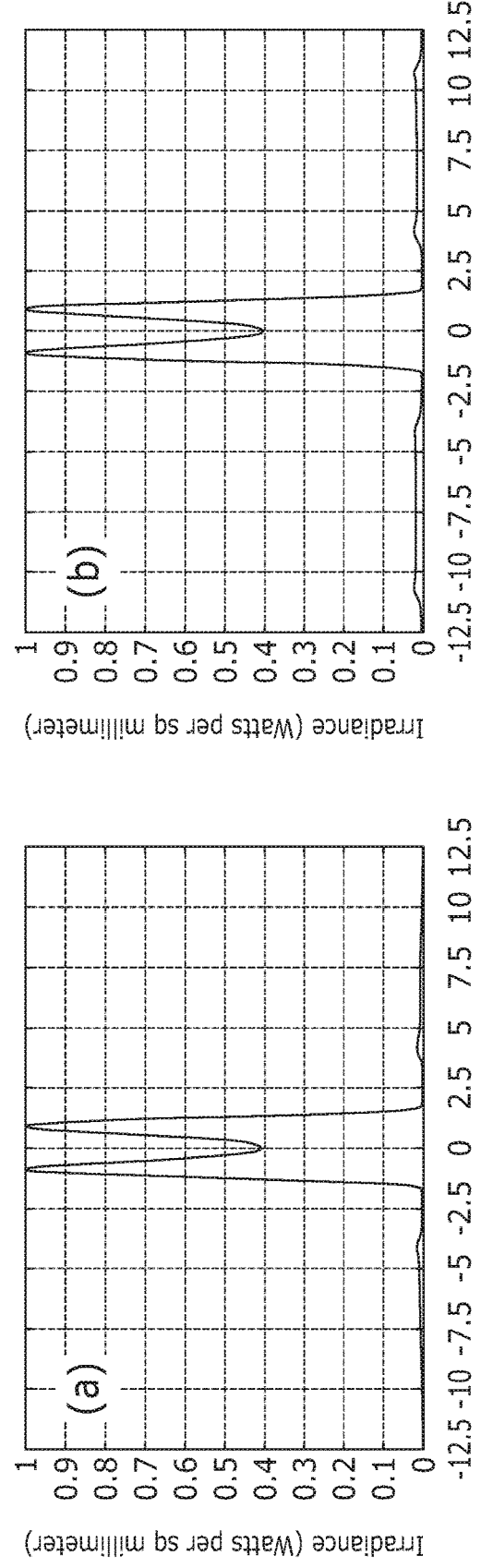

FIGS. 19 and 20 compare a Gaussian beam profile and a flat-top beam profile for the case where the system is correctly aligned. In this case it can be seen that the central diffraction pattern (that is the pattern in the target window) is the same for both beam profiles. This can also be seen in the graphs of beam profile shown in FIG. 20. However, the flat-top beam profile has more light at the sides of the pattern as would be expected from the input profile.

FIGS. 21 and 22 compare the diffraction patterns for a 700 μm misalignment of the laser beam on the second alignment reference. Again the patterns are largely similar except for increased light at the sides for the flat-top profile. Thus, determination of correct alignment can be achieved in the same way for a flat-top beam profile as compared to a Gaussian beam profile. The method is not sensitive to different wavefront types or wavefront distortions.

Effect of Pinhole Size

Figure 23:
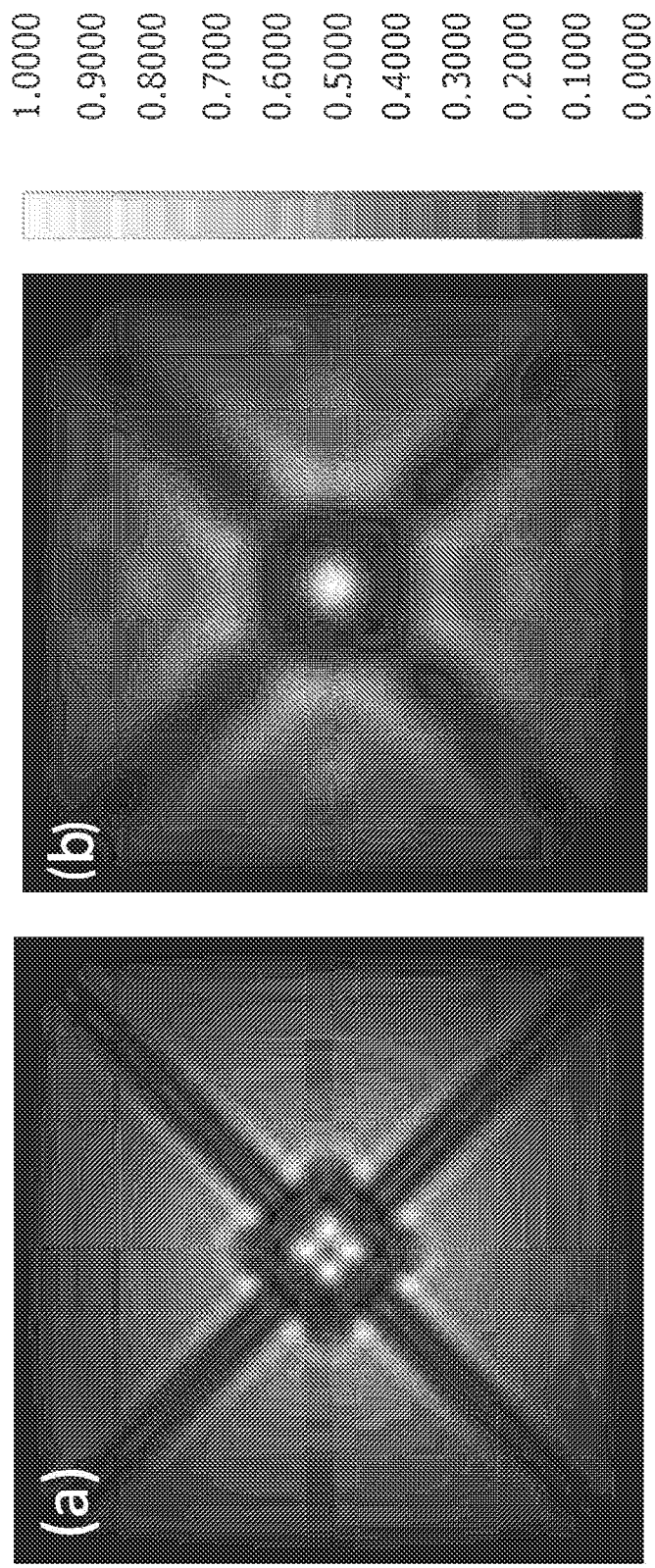
FIGS. 23a and 23b show the effect of pinhole diameter on diffraction pattern respectively for 2 mm and 0.6 mm pinholes.

A simulation was carried out in order to assess the impact of pinhole size on diffraction pattern. Design of the alignment references needs to be carried out keeping in consideration the size of pinholes which will be installed in the laser chain. While no simple analytic formula to guide the design process exists, numerical simulation software such as Zemax (previously known as Radiant Zemax) allows simulations to be carried out on the effect of pinholes on diffraction patterns of alignment references. FIG. 23 shows the case of how the diffraction pattern of a single reference can be affected by the pinhole size.

FIG. 23(a) shows the diffraction pattern of a single alignment reference, such as one of those of FIGS. 2-5, propagated through a 2 mm diameter pinhole. Here it can be seen that there is some distortion/blurring of the target window and recognisable features. FIG. 23 (b) shows the equivalent case for a single alignment reference propagated through a 0.6 mm diameter pinhole. Here it is much more difficult to determine any features of the diffraction pattern inside the target window. Hence, care should be taken when using pinholes that the alignment references are compatible.

Alternative Embodiments of Alignment Reference

Alternative embodiments of alignment reference have been designed for use in the same systems as those of FIGS.

2-5. These alternative embodiments are shown in the technical drawings of FIGS. 24 and 25. The reference shown in FIG. 24 was used as an input reference for the 100 J amplifier mentioned above, and again was for use at a position where the beam had a size of 21.5 mm×21.5 mm. The beam was subsequently magnified to a size of 75 mm×75 mm by a telescope and a second alignment reference, shown in FIG. 25, was placed in the beam.

Figure 24:
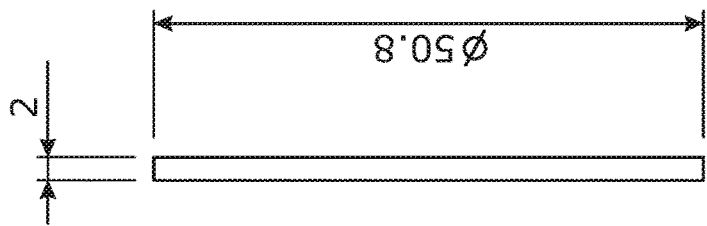
FIGS. 24 and 25 are detailed drawings showing plan and side views of first and second alignment references according to an alternative embodiment.
Figure 24:
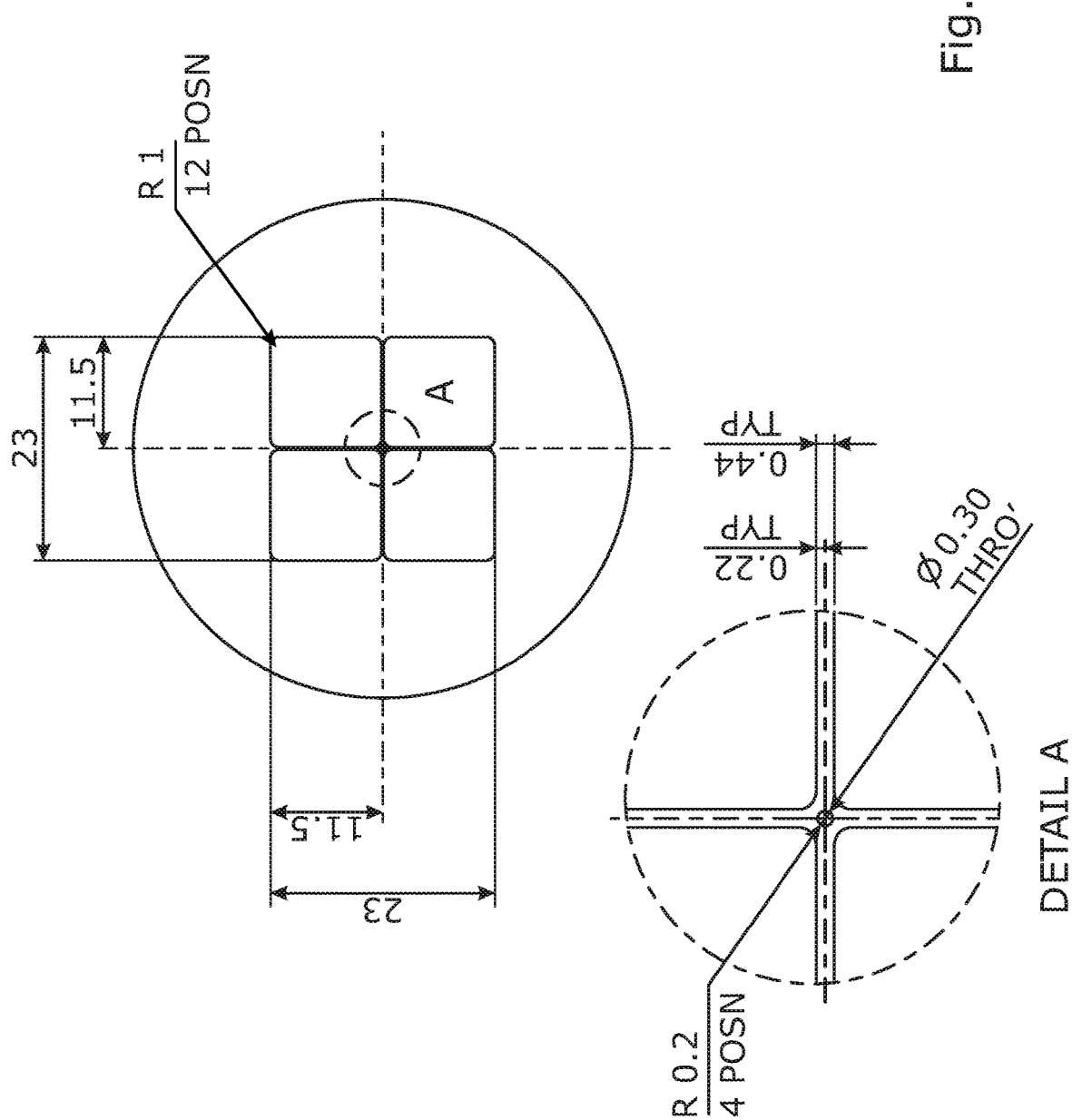

The input reference shown in FIG. 24 is made of a circular plate or disc into which the alignment reference features are machined, in the centre of the plate. Similar to reference 100 described earlier in this document, the alignment reference is made up of elements or lines in a "+" upright cross-type arrangement. Here the target window is much smaller. A 0.3 mm diameter circular hole is positioned at the centre of the crossing elements.

Figure 25:
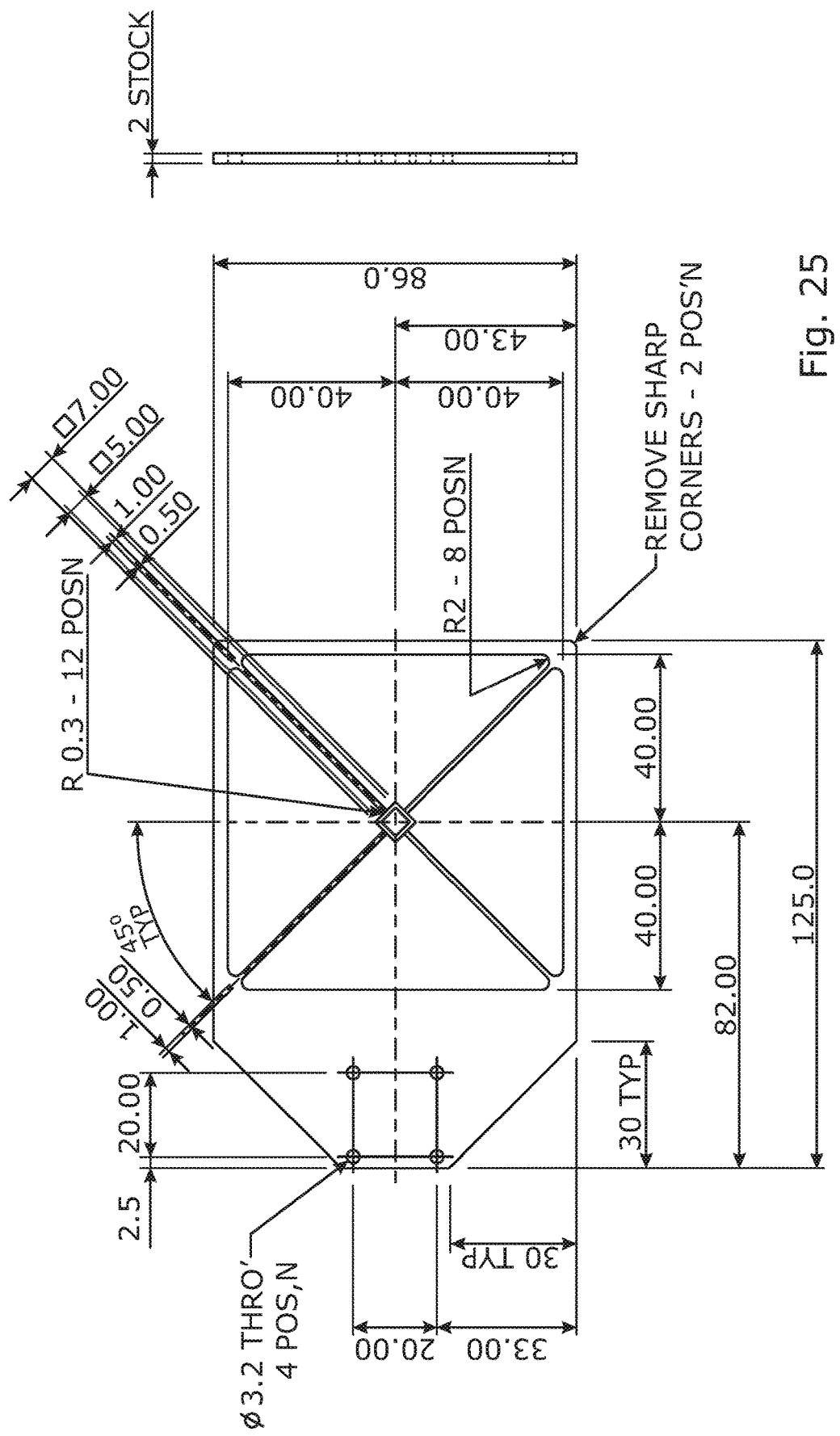

The second alignment reference is shown in FIG. 25. This reference is similar to that 200 described earlier in this document, having a diagonal cross type "X" arrangement of elements or lines. The main through apertures of the reference have been increased in size. The target window has also been expanded from an internal size of 3.0 mm to 5.0 mm. In this alternative embodiment the combination of a square target window increased in size over the earlier embodiments and a small circular target window provide suitable diffractions patterns.

Figure 26A:
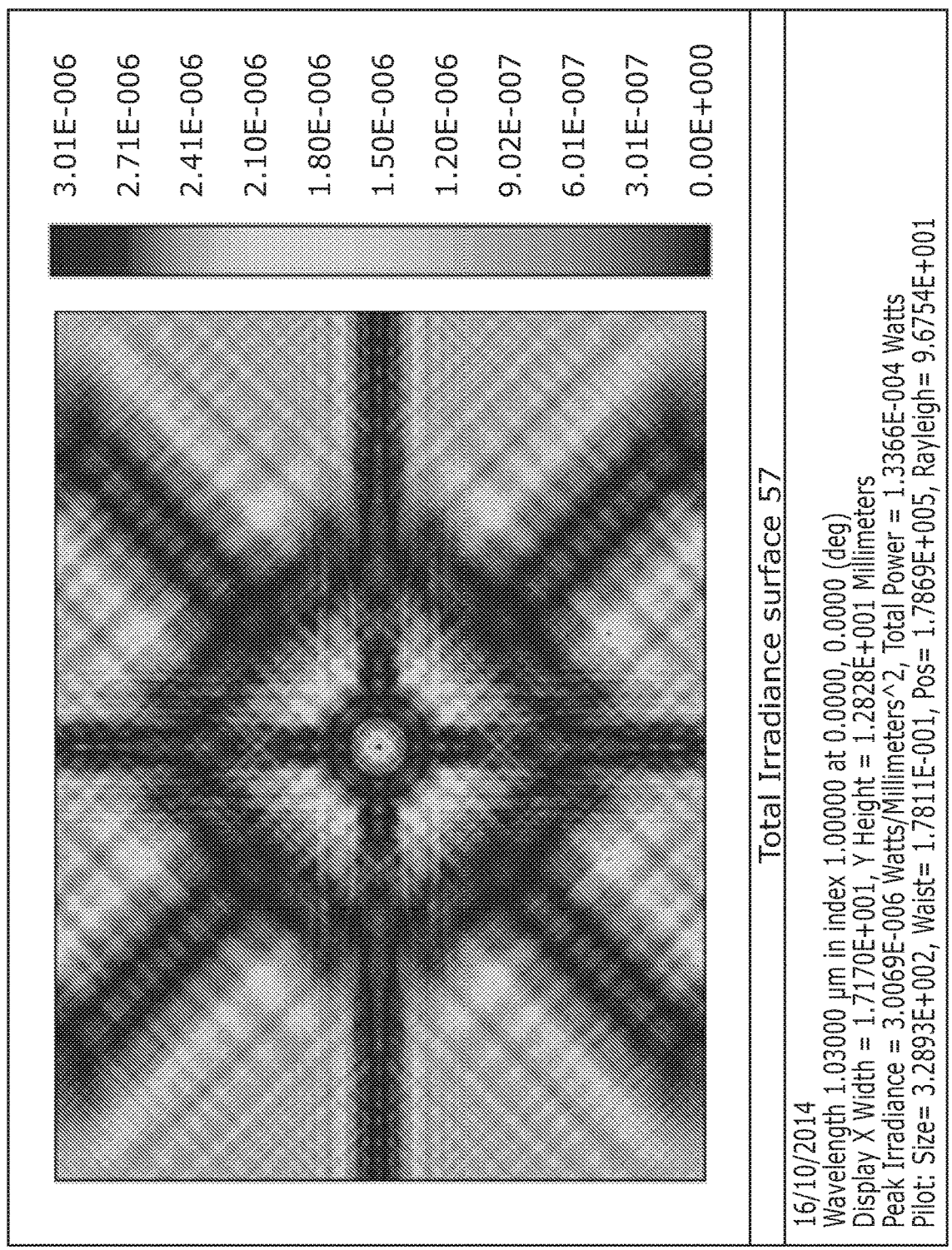
FIGS. 26a and 26b show simulated diffraction patterns produced by the alignment references of FIGS. 24 and 25 respectively when there is no misalignment and when there is 0.5 mm misalignment of the laser beam at the second reference.
Figure 26B:
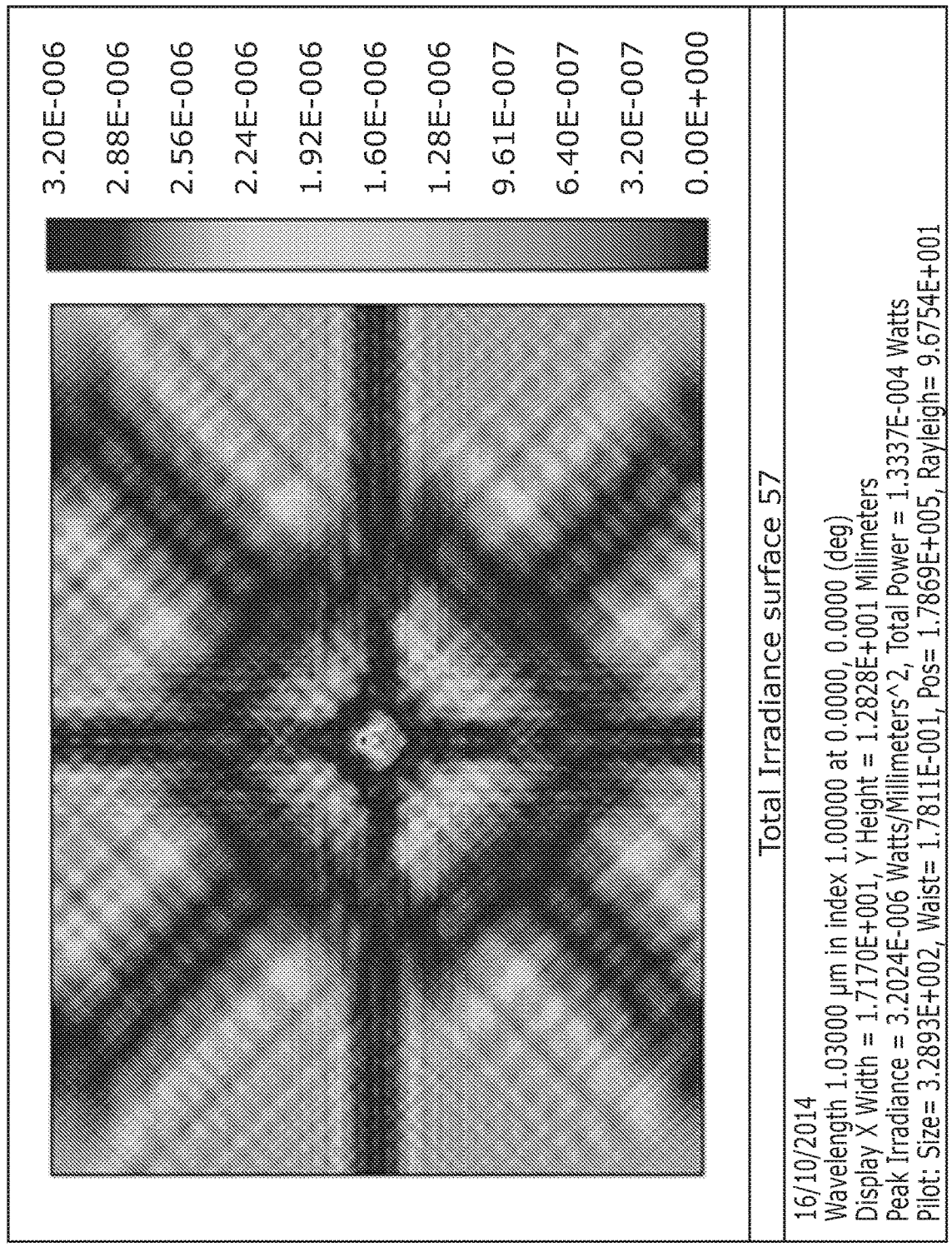

FIG. 26 shows the resulting diffraction pattern for a correctly aligned laser chain (FIG. 26a) and for a laser beam misaligned by 500 μm at the second reference. The shadow of both the small circular target window and larger diagonal square target window can be seen. The variation in diffraction patterns is also seen and is similar to that of FIGS. 8-12. For example, in FIG. 26a a diffraction pattern having circular symmetry is seen at the centre of the small circular target window. In FIG. 26b the symmetry of this circular diffraction is broken by the misalignment. Furthermore, in the region between the two target windows, the misalignment also causes a break in the symmetry of the diffraction pattern seen there.

The person skilled in the art will readily appreciate that various modifications and alterations may be made to the above described embodiments without departing from the scope of the appended claims.

The invention claimed is:

1. A method of aligning an optical component in a laser system, comprising:
placing a first alignment reference in the path of the laser beam upstream of the optical component, the first alignment reference having first reference features forming a first diffraction pattern when illuminated by the laser beam, the first reference features comprising a first target window at a center of a beam pass window in the first alignment reference;
placing a second alignment reference in the path of the laser beam downstream of the first alignment reference and the optical component, the second alignment reference having second reference features forming a second diffraction pattern when illuminated by the laser beam, the second reference features comprising a second target window at a center of a beam pass window in the second alignment reference;
illuminating the alignment references and optical component with the laser beam;
monitoring the combined diffraction pattern of the reference features of the first and second alignment references at a position downstream of the second alignment reference, wherein the monitoring comprises monitoring the combined diffraction pattern enclosed by the shadow of the second target window; and
adjusting the relative position and/or orientation of the optical component towards the combined diffraction pattern indicating alignment of the optical component to the laser beam.

2. The method of claim 1, wherein the step of adjusting the position and/or orientation of the optical component towards alignment comprises adjusting the position and/or orientation of the optical component to improve the symmetry or centricity of the combined diffraction pattern.

3. The method of claim 1, wherein the reference features of the first and/or second alignment references have reflection symmetry in two orthogonal planes.

4. The method of claim 1, wherein the reference features of the first and/or second alignment references comprise a rectangle or square.

5. The method of claim 1, wherein the steps of monitoring and adjusting comprise monitoring the combined diffraction pattern and adjusting the position and/or orientation of the optical component to bring the combined diffraction pattern towards a centring on the shadow of the target window of the second alignment reference.

6. The method of claim 5, wherein the combined diffraction pattern indicates the optical component is substantially aligned in the laser system when the combined diffraction pattern has reflection symmetry in two orthogonal directions and is centred on the shadow of the target window of the second alignment reference.

7. The method of claim 1, wherein the step of monitoring comprises monitoring the combined diffraction pattern enclosed by the shadows of the first and second target windows.

8. The method of claim 7, wherein the step of monitoring comprises monitoring the symmetry and/or centring of the combined diffraction pattern enclosed by the shadows of the first and second target windows.

9. The method of claim 1, wherein the step of placing the first alignment reference in the path of the laser beam upstream of the optical component comprises placing the first alignment reference in the near-field of the laser and centring the near field on a beam pass window of the first alignment reference.

10. The method of claim 9, wherein the step of centring the near field comprises aligning the laser beam cross-dimension to fit within the beam pass window of the first alignment reference.

11. The method of claim 1, wherein one or more of the first reference features of the first alignment reference are arranged offset by substantially 45° to one or more of the second reference features of the second alignment reference about the axis of the laser beam.

12. The method of claim 1, wherein if the symmetry of the of the combined diffraction pattern within the shadow of a target window is offset vertically then moving the optical component vertically to bring said component towards alignment, and if the combined diffraction pattern within the shadow of a target window is offset horizontally then moving the optical component horizontally to bring said component towards alignment.

13. The method of claim 1, wherein the step of monitoring comprises at least one of sensing the combined diffraction pattern on a camera or carrying out a visual inspection of the beam.

14. The method of claim 1, wherein a beam pass window of the first alignment reference and/or second alignment reference is sized to be greater than the cross-dimensions of the laser beam.

15. The method of claim 1, wherein the optical component is at least one of a mirror, lens, pinhole, aperture, amplifier, gain block, or reflection/transmission grating.

16. The method of claim 1, wherein the first and second alignment references and the monitoring are not at image or object planes.

17. The method of claim 1, wherein the step of monitoring the combined diffraction pattern comprises measuring the intensity of the combined diffraction pattern along a line passing though the centre of the shadow of a target window and determining if the intensity is symmetric along the line across the window.

18. The method of claim 1, further comprising repeating the steps of monitoring and adjusting until alignment is achieved.

19. A method of aligning an optical component in a laser system, comprising:
   placing a first alignment reference in the path of the laser beam upstream of the optical component, the first alignment reference having first reference features forming a first diffraction pattern when illuminated by the laser beam;
   placing a second alignment reference in the path of the laser beam downstream of the first alignment reference and the optical component, the second alignment reference having second reference features forming a second diffraction pattern when illuminated by the laser beam;
   illuminating the alignment references and optical component with the laser beam;
   monitoring the combined diffraction pattern of the reference features of the first and second alignment references at a position downstream of the second alignment reference, wherein monitoring comprises:
      identifying a whole or part of a cross or X in the combined diffraction pattern within the shadow of a target window of the first and/or second alignment reference; and
      assessing if the cross or X is offset from the centre of the shadow of the target window; and
   if the cross or X is offset then adjusting the relative position and/or orientation of the optical component to bring the cross or X towards being centred on the shadow of the target window, thereby increasing alignment of the optical component.

20. A system of diffraction-based alignment references for aligning an optical component in a laser system, comprising:
   a first alignment reference having first reference features for forming a first diffraction pattern when illuminated by a laser beam, the first alignment reference having a first beam pass window; and
   a second alignment reference having second reference features for forming a second diffraction pattern when illuminated by the laser beam, the second alignment reference having a second beam pass window; the second beam pass window having the same shape as the first beam pass window,
   wherein the second reference features comprise at least a target window for monitoring the combined diffraction pattern of the reference features of the first and second alignment references so as to provide an indication of the alignment of the optical component to the laser beam, and
   wherein the first beam pass window and second beam pass window are non-circular, and when the first beam pass window and second beam pass window are aligned by said non-circular shape, at least some of the first reference features are angularly offset to at least some of the second reference features.

21. The system of claim 20, wherein the target window of the second alignment reference is arranged within the beam pass window.

22. The system of claim 21, wherein the target window is substantially centred within the beam pass window.

23. The system of claim 20, wherein the reference features of the second alignment reference comprise lines which do not cross through the target window.

24. The system of claim 23, wherein the lines comprise orthogonal lines.

25. The system of claim 20, wherein the target window of the second alignment reference is a second target window, and the first reference features comprise at least a first target window.

26. The system of claim 25, wherein the target window of the first alignment reference is arranged within the beam pass window of the first alignment reference.

27. The system of claim 26, wherein the first target window is substantially centred within the beam pass window of the first alignment reference.

28. The system of claim 25, wherein the reference features of the first alignment reference comprise lines which do not cross through the first target window.

29. The system of claim 28, wherein the lines of the first alignment reference comprise orthogonal lines.

30. The system of claim 25, wherein the first target window and second target window are square, rectangular or circular.

31. The system of claim 20, wherein the beam pass windows of first alignment reference and second alignment reference are square, rectangular or circular.

32. The system of claim 20, wherein when the first beam pass window and the second beam pass window are aligned by said non-circular shape, at least some of the first reference features are offset by 45 degrees to at least some of the second reference features.

33. The system of claim 20, wherein the first and second alignment reference are each comprised of a plate having a first portion for mounting the device and a second portion in which the reference features are formed.

34. The system of diffraction based alignment references of claim 20, further comprising a laser adapted to generate the laser beam.

* * * * *